(12) United States Patent
Bishop

(10) Patent No.: US 8,694,376 B2
(45) Date of Patent: Apr. 8, 2014

(54) DYNAMICALLY AND PREDICTIVELY UPDATING MOBILE DEVICES AS MOBILE USERS PASS THROUGH PROJECTED LOCATIONS

(75) Inventor: Michael L. Bishop, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1023 days.

(21) Appl. No.: 12/235,083

(22) Filed: Sep. 22, 2008

(65) Prior Publication Data
US 2010/0076829 A1    Mar. 25, 2010

(51) Int. Cl.
*G06Q 30/00* (2012.01)
*G01C 21/32* (2006.01)
*G06F 7/00* (2006.01)
*G06F 15/16* (2006.01)

(52) U.S. Cl.
USPC .............. 705/14.58; 705/14.45; 705/14.63; 705/14.64; 705/37; 701/527; 707/736; 709/217

(58) Field of Classification Search
USPC ........ 701/211, 527; 705/37, 14, 14.58, 14.45, 705/14.63, 14.64; 707/100, 736; 709/217; 455/414.2
See application file for complete search history.

(56) References Cited

U.S. PATENT DOCUMENTS

| | | | |
|---|---|---|---|
| 7,650,431 B2 | 1/2010 | Wang | |
| 2004/0186902 A1* | 9/2004 | Stewart | 709/217 |
| 2006/0095329 A1 | 5/2006 | Kim | |
| 2006/0253481 A1* | 11/2006 | Guido et al. | 707/100 |
| 2006/0277108 A1 | 12/2006 | Altberg et al. | |
| 2007/0050279 A1* | 3/2007 | Huang et al. | 705/37 |
| 2007/0061198 A1 | 3/2007 | Ramer et al. | |
| 2007/0061205 A1* | 3/2007 | Crolley | 705/14 |
| 2007/0106468 A1* | 5/2007 | Eichenbaum et al. | 701/211 |
| 2007/0276729 A1 | 11/2007 | Freer | |
| 2008/0046324 A1 | 2/2008 | Bailey et al. | |
| 2008/0133580 A1 | 6/2008 | Wanless et al. | |
| 2008/0182564 A1* | 7/2008 | Frank et al. | 455/414.2 |
| 2009/0104895 A1 | 4/2009 | Kasturi | |
| 2009/0112782 A1 | 4/2009 | Cross et al. | |
| 2010/0036604 A1* | 2/2010 | O'Connell et al. | 701/202 |
| 2010/0076849 A1 | 3/2010 | Bishop | |
| 2010/0312646 A1 | 12/2010 | Gupta et al. | |

OTHER PUBLICATIONS

U.S. Official Action dated Dec. 30, 2010 in U.S. Appl. No. 12/235,120.
U.S. Official Action dated Apr. 21, 2010 in U.S. Appl. No. 12/235,120.

* cited by examiner

*Primary Examiner* — John G Weiss
*Assistant Examiner* — Marilyn G Macasiano
(74) *Attorney, Agent, or Firm* — Parks IP Law LLC; Mickki D. Murray, Esq.

(57) ABSTRACT

This description provides tools and techniques for dynamically and predictively updating mobile devices as mobile users pass through projected locations. These tools may provide methods that include defining thresholds applicable to at least portions of travel itineraries on which mobile users are traveling. The methods may also identify advertisements to send to mobile devices associated with the mobile users, upon meeting the threshold. The methods may also send the selected advertisements, as associated with corresponding advertisers, to the mobile devices.

18 Claims, 15 Drawing Sheets

DYNAMICALLY AND PREDICTIVELY UPDATING MOBILE DEVICES AS MOBILE USERS PASS THROUGH PROJECTED LOCATIONS

BACKGROUND

Mobile communications devices are continually gaining increased capabilities, particularly capabilities for accessing the Internet over global communications networks. With these increased capabilities, mobile users operating these mobile devices may access an increasing array of content, websites, and other information over the Internet. Typically, these mobile devices are relatively compact and portable, as compared to notebooks or laptop computers.

While these mobile users may access the Internet via browser software on the mobile device, the compact dimensions of the mobile device may result in smaller or more limited browser displays. The widespread proliferation of these mobile communications devices provides merchants with increased opportunities to advertise to these mobile users via these mobile devices. In addition, locating merchants by navigating through the browser may involve multiple steps performed through the limited browser display. Some mobile users may not be familiar with operating the browsers on their mobile devices, and may not be comfortable navigating the Internet on their mobile devices to locate merchants.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This description provides tools and techniques for dynamically and predictively updating mobile devices as mobile users pass through projected locations. These tools may provide methods that include defining thresholds applicable to at least portions of travel itineraries on which mobile users are traveling. The methods may also identify advertisements to send to mobile devices associated with the mobile users, upon meeting the threshold. The methods may also send the selected advertisements, as associated with corresponding advertisers, to the mobile devices.

Other apparatus, systems, methods, and/or computer program products according to embodiments will be or become apparent to one with skill in the art upon reviewing the following drawings and Detailed Description. It is intended that all such additional apparatus, systems, methods, and/or computer program products be included within this description, be within the scope of the claimed subject matter, and be protected by the accompanying claims.

DETAILED DESCRIPTION

The following detailed description is directed to methods, systems, and computer-readable media for managing advertising services for mobile devices and users. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
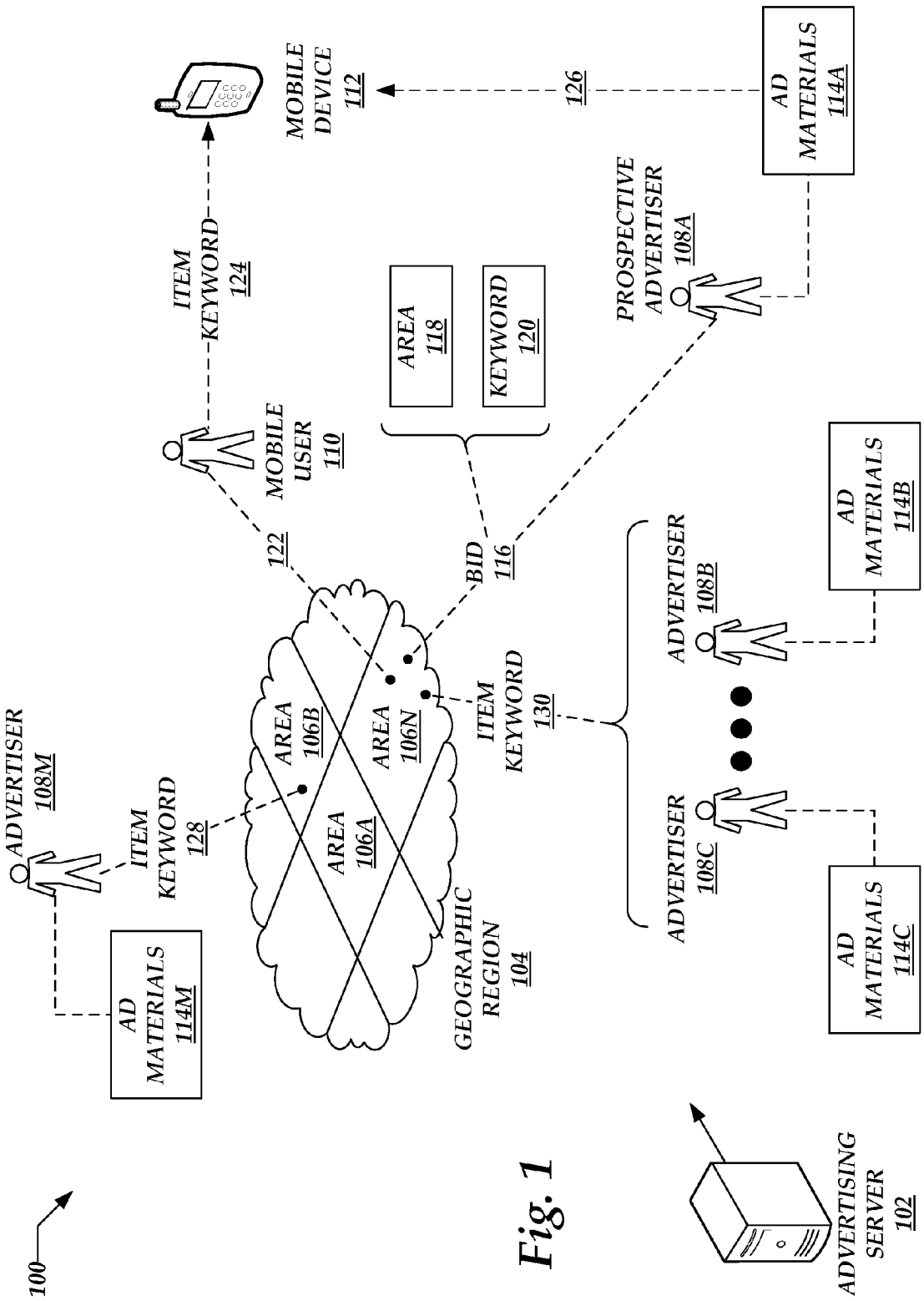
FIG. 1 is a block diagram illustrating systems or operating environments for dynamically and predictively updating mobile devices as mobile users pass through projected physical locations, according to exemplary embodiments.

FIG. 1 illustrates systems or operating environments, denoted generally at 100, for managing advertising services for mobile devices and users. These systems 100 may include advertising servers 102, which may provide and manage advertising services for mobile devices and users within a given geographic region 104. The geographic region 104 may represent geographies having arbitrary sizes and shapes, chosen as appropriate for different implementations. For example, the geographic region 104 may represent a given state, province, county, city, or the like, whether or not these regions are organized into political entities.

The geographic region 104 may be sub-divided into any number of areas, with FIG. 1 providing examples of areas at 106a, 106b, and 106n (collectively, areas 106). These areas 106 may take any arbitrary size and shape, and may or may not be uniform or consistent with one another. Turning to the area 106n as an example, the advertising server 102 may enable any number of advertisers or prospective advertisers 108a, 108b, 108c, and 108m (collectively, advertisers 108) to bid for and win the right to present advertisements to any mobile users 110 and corresponding mobile devices 112 entering the area 106n. These advertisers 108 may include merchants dealing commercially in particular goods and/or services (collectively, "items"). However, the advertisers 108 may also include non-profit entities, governmental agencies, weather agencies, or the like. In some scenarios, the advertising services described herein may include providing advertisements, promotions, and other similar commercially-oriented materials. However, in other scenarios, the advertising services or materials may include providing public service announcements (PSAs), alerts, messages, and the like, on behalf of commercial or non-commercial entities.

For example, the advertiser 108a may win the right to present advertising materials 114a to the mobile user 110 via the mobile device 112. Similarly, the advertisers 108b, 108c, and 108m may win the right to present respective advertising materials 114b, 114c, and 114m. This description may refer to the advertising materials 114a-114m collectively at 114.

As detailed further below, the advertising server 102 may facilitate a bidding process, by which the various advertisers 108 may compete for and win the rights to present the advertising materials 114 to various mobile users 110 and mobile devices 112, which may enter different areas 106 within the geographic region 104. FIG. 1 illustrates a scenario in which the advertisers 108a, 108b, and 108c have won the right to present their advertising materials 114 to mobile users entering the area 106n. As another example, the advertiser 108m has won the right to present its advertising materials 114m to any mobile users 110 and mobile devices 112 entering the area 106b.

Turning to the bidding process facilitated by the advertising server 102 in more detail, the various advertisers 108 may submit respective bids, with FIG. 1 providing an example bid 116 as submitted by the advertiser 108a. This bid 116 may contain an area field 118, which references a particular geographic area (e.g., 106n). In some cases, the bid 116 may reference the entire geographic region 104. This bid 116 may also contain a keyword field 120, which may reference a particular keyword on which the advertiser 108a is bidding. For example, these keywords may relate to particular goods and/or services (collectively, "items") made available by the advertiser 108a. More specifically, if the advertiser 108a is a pizzeria, the keyword field 120 may include the text "pizza".

The mobile user 110 and the mobile device 112 may enter the area 106n, as represented generally at 122. Afterwards, the mobile user 110 may provide an item keyword 124 to the mobile device 112. In example of the item keyword 124 may be "pizza". In different possible scenarios described further below, the user 110 may activate an entry in a contact list, address book, or other storage structure corresponding to pizza. In other scenarios, the user 110 may verbalize the term "pizza". In still other scenarios, the user 110 may initiate a search incorporating the search term "pizza".

In example scenarios, assume that the advertiser 108a (e.g., a pizzeria) wins the right to advertise within the area 106n in connection with the keyword "pizza". When the user 110 provides the item keyword 124 (e.g., "pizza") to the mobile device 112, the mobile device 112 may present the advertising materials 114a provided by the pizzeria, as represented generally at 126. In turn, the user 110 may respond to the advertising materials 114a as described further below.

Generalizing from the above example, the advertising server 102 may associate any number of advertisers 108 with particular geographic areas 106, enabling the advertisers to respond to the keywords 124 as provided to any mobile devices 112 while within these areas. As shown in FIG. 1, the advertising server 102 may enable the advertiser 108m to respond to a given item keyword 128 within the area 106b. In another example scenario, two or more advertisers 108b and 108c may respond to a given item keyword 130 within the geographic area 106n.

Having described the overall operating environments or systems 100 in FIG. 1, the discussion now turns to a more detailed description of components and data flows by which the advertising server 102 may facilitate bidding processes. This description is now provided with FIG. 2.

Figure 2:
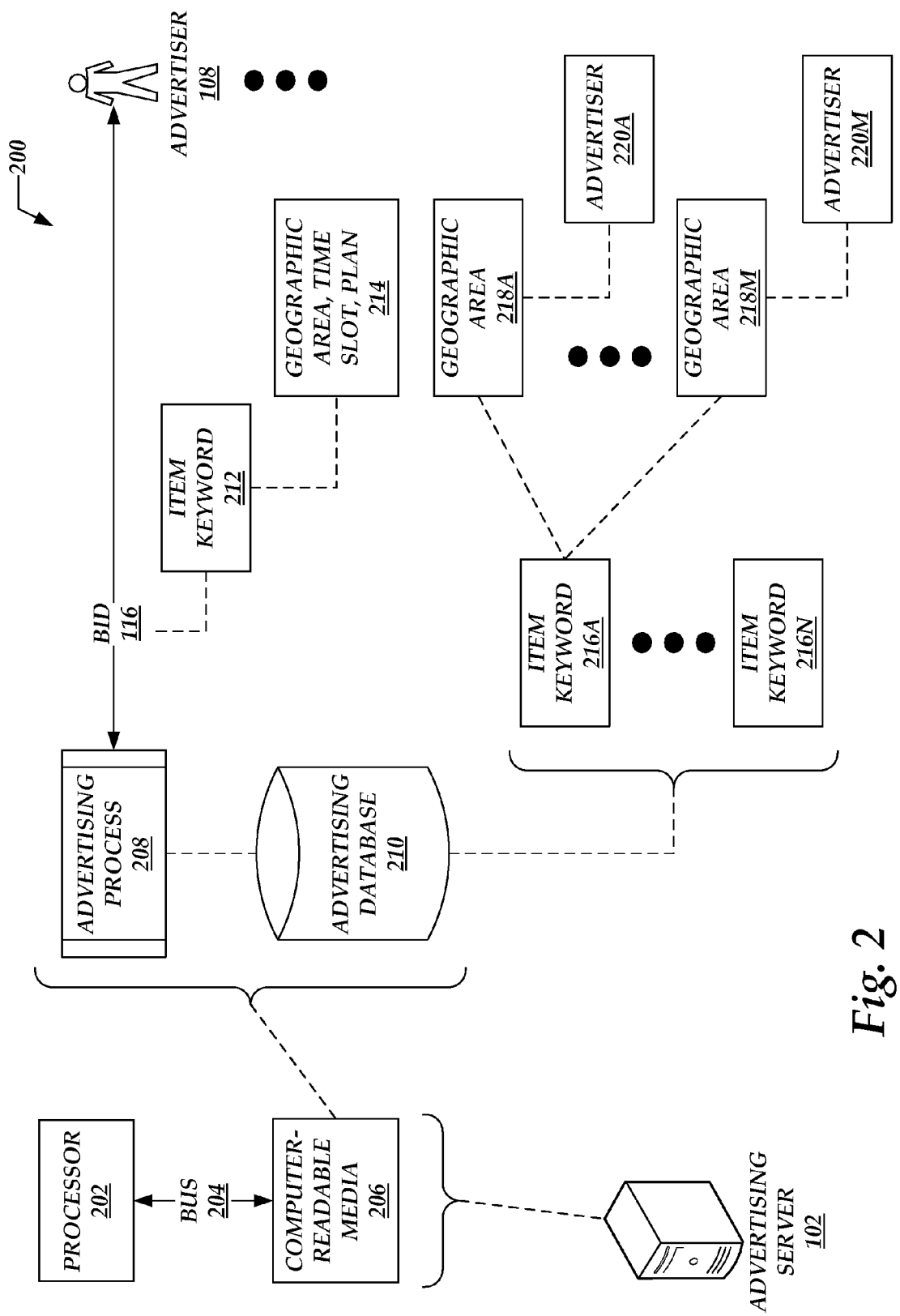
FIG. 2 is a block structure diagram illustrating components and data flows by which an advertising server may facilitate bidding processes among advertisers, according to exemplary embodiments.

FIG. 2 illustrates components and data flows, denoted generally at 200, by which the advertising server 102 may facilitate bidding processes among advertisers. For convenience of description, but not to limit possible implementations, FIG. 2 may carry forward some items introduced in previous drawings, and may refer to such items by identical reference numbers. For example, FIG. 2 carries forward representations of an advertising server 102 and a representative advertiser 108. In some cases, the advertiser 108 may be a "prospective" advertiser, in the sense that the advertiser has not yet won the right to present advertisements via the advertising server 102.

Turning to the advertising server 102 in more detail, this server may include one or more processors 202, which may have a particular type or architecture, chosen as appropriate for particular implementations. The processors 202 may couple to one or more bus systems 204 chosen for compatibility with the processors 202.

The servers 102 may also include one or more instances of computer-readable storage media 206, which couple to the bus systems 204. The bus systems 204 may enable the processors 202 to read code and/or data to/from the computer-readable storage media 206. The media 206 may represent storage elements implemented using any suitable technology, including but not limited to semiconductors, magnetic materials, optics, or the like. The media 206 may include memory components, whether classified as RAM, ROM, flash, or other types, and may also represent hard disk drives.

The storage media 206 may include one or more modules of instructions that, when loaded into the processor 202 and executed, cause the servers to perform various techniques for managing advertising services for mobile devices and users. As detailed throughout this description, these modules of instructions may also provide various means by which the devices 104 may participate in the techniques for managing advertising services, using the components, flows, and data structures described in more detail throughout this description. For example, the storage media 206 may include one or more software modules that provide an advertising process 208. In addition, the storage media may also include any number of data storage structures accessible to the advertising process 208. For example, an advertising database 210 may store various data as described herein in connection with the advertising process 208.

Turning to the advertising process 208 in more detail, this process may enable the advertisers 108 to submit bids (e.g., 116) to the advertising server 102. These bids 116 may include representations 212 of item keywords that mobile users (e.g., 110 in FIG. 1) may activate on mobile devices (e.g., 112). In addition, these bids 116 may include representations 214 of particular geographic regions or areas on which the advertiser 108 is bidding. FIG. 1 provides examples of a geographic region at 104, and provides examples of areas at 106a-106n.

In addition to geographic areas, the bids 116 may reference other parameters. Examples of such additional parameters may include discrete time slots on which advertisers may bid, such that when a given mobile user activates the keyword during the time slot while within the given area, the mobile user would receive advertisements from the advertisers. Other examples of these additional parameters may include parameters that specify particular service plan levels or subscriber features on which the advertisers are bidding. More specifically, these bid parameters may enable advertisers to direct offerings more particularly to different groups of mobile users. The service plan levels may serve as rough indicators of incomes associated with different mobile users, enabling the advertisers to target mobile users with product/service offerings according to income. As shown in FIG. 2, block 214 generally represents these parameters (e.g., geographic area, particular time slots, service plan levels, etc.).

Having received any number of the bids 116 from any number of advertisers 108, the advertising process 208 may store these bids into the advertising database 210. In general, the advertising database may store keyword representations 216a-216n (collectively, keyword representations 216) of any number of item keywords on which various advertisers 108 have submitted bids. In addition, the advertising database may associate particular keyword representations (e.g., 216a) with any number of area representations 218a-218m (collectively, area representations 218) of particular geographic areas on which advertisers have submitted bids for that keyword.

The area representations 218 may also identify the advertisers who have won the right to respond to the item keyword within particular geographic areas. For example, the area representation 218a may be associated with a advertiser representation 220a, which identifies one or more advertisers that bid for and won the right to respond to the item keyword within a given geographic area. Similarly, the area representation 218m may be associated with a advertiser representation 220m.

Referring to both FIGS. 1 and 2 for a non-limiting operational example, the keyword representation 216a may correspond to the item keyword "pizza". In turn, the area representation 218a may correspond to the area 106b shown in FIG. 1, and the area representation 218m may correspond to the area 106n, also shown in FIG. 1. The advertisers 108a and 108m may represent different pizzerias, with the pizzeria 108a bidding for and winning the right to respond to the keyword "pizza" within the area 106n, and the pizzeria 108m pitting for and winning the right to respond to the same keyword within the different area 106b. In this scenario, the advertiser representation 220a may indicate that the advertiser 108m is to respond to the keyword "pizza" within the area 106b, and the advertiser representation 220m may indicate that the advertiser 108a is to respond to this same keyword within the area 106n.

Having described the components and data flows 200 by which the advertising server 102 may facilitate bidding processes among advertisers, the discussion now receipts to a description of process flows that the advertising process 208 may perform. This description is now provided with FIG. 3.

Figure 3:
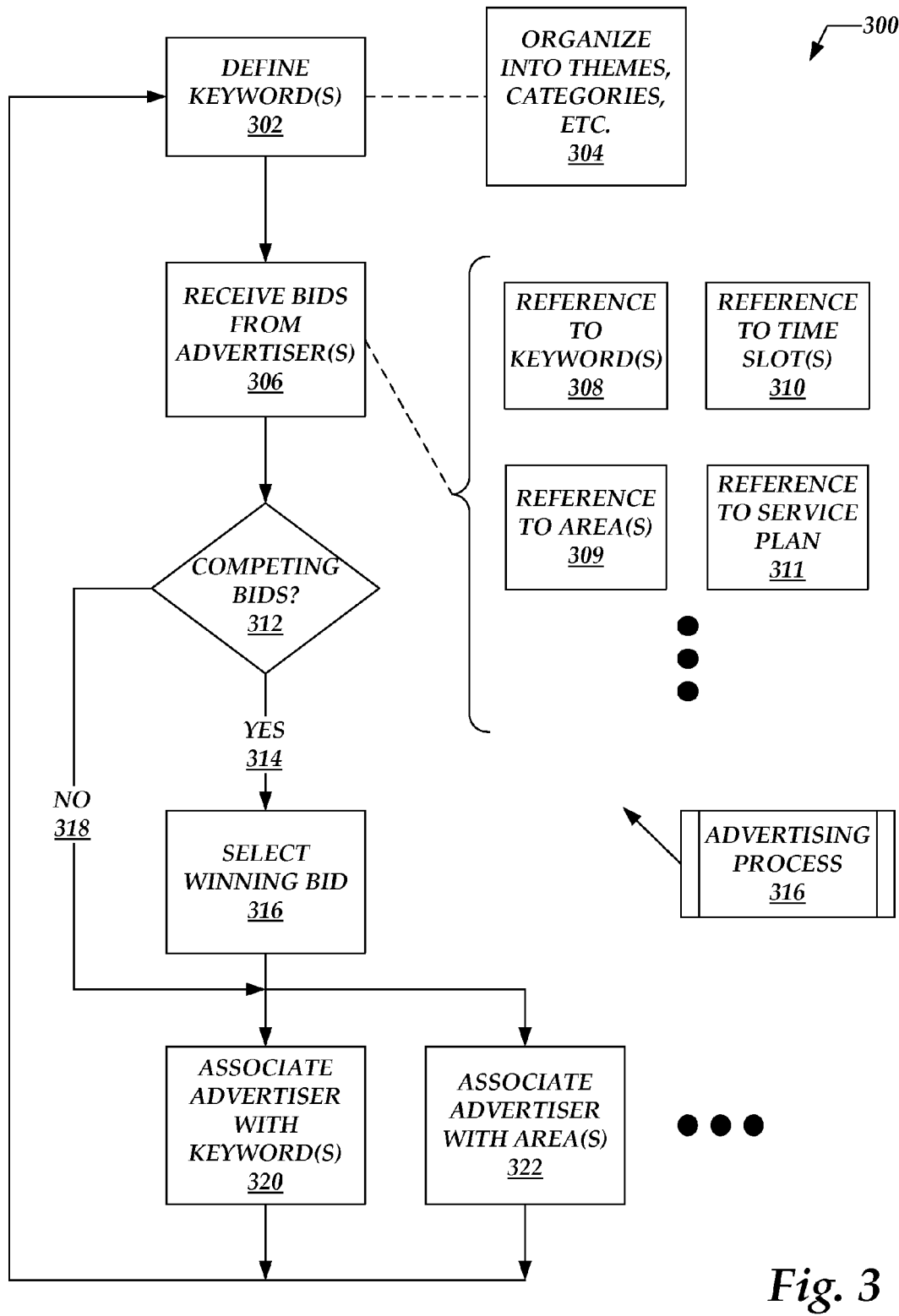
FIG. 3 is a flow diagram illustrating processes by which the advertising server may facilitate bidding among advertisers, according to exemplary embodiments.

FIG. 3 illustrates process flows, denoted generally at 300, by which the advertising server 102 may facilitate bidding processes among advertisers. For the purposes of the present description, but not to limit possible implementations, FIG. 3 illustrates certain processing as being performed by advertising server 102, through the advertising process 208. However, it is noted that implementations of the process flows 300 may perform at least portions of this processing using other devices, systems, or components, without departing from the scope and spirit of this description.

Turning to the process flows 300 in more detail, block 302 represents defining one or more keywords available for bidding by the various advertisers (e.g., 108). Examples of these keywords defined in block 302 may include any keywords that mobile users may activate in connection with mobile devices, with FIG. 1 providing examples of keywords at 124, 128, and 130. In some scenarios, block 302 may include establishing a set of predefined keywords in which various advertisers may bid. In other scenarios, block 302 may include collecting a set of keywords previously defined by advertisers and/or mobile users.

In some implementations, the advertising process 208 may support numerous possible keywords. In these implementations, block 304 may represent organizing these keywords into various themes, categories, or the like. As described in further detail below, the advertising server 102 may enable mobile users to download one or more of these themes or categories, thereby populating or configuring their corresponding mobile devices with the keywords contained within the downloaded themes or categories. For example, a "travel" category may include various keywords associated with restaurants, lodging, gas stations, rest areas, or the like. A "health" category may include keywords associated with hospitals, pharmacies, emergency rooms, urgent care centers, doctors' offices, or the like. However, these examples are provided only for the sake of illustration, and implementations of this description may include other types of categories or themes as well.

Block 306 represents receiving any number of bids from advertisers. FIG. 1 provides an example bid at 116, as submitted by a given advertiser 108a. As shown in FIG. 3, block 306 may include receiving a bid that refers to one or more item keywords (e.g., 120 in FIG. 1), as represented generally in block 308. In addition, block 306 may include receiving a bid that refers to one or more geographic regions or areas (e.g., 118 in FIG. 1), as represented generally in block 309. Bids may also reference other examples of parameters, for example, particular time slots (block 310), service plan levels or features (block 311), and the like.

Decision block 312 represents determining whether bids as submitted by advertisers conflict or compete with one another. For example, two or more incoming bids may compete with one another. In another example, one incoming bid may compete with a previously-accepted bid. More specifically, decision block 312 may include determining whether these competing bids reference the same keyword in the same geographic area. For example, two or more pizzerias may bid for the right to respond to the keyword "pizza" within the same geographic area or region.

From decision block 312, when competing bids architected, the process flows 300 may take Yes branch 314 to block 316, which represents selecting a winning bid. For example, advertisers may offer to pay an advertising fee, in exchange for the right to respond to a given keyword within a given geographic area, and block 316 may select a winning bid by comparing the advertising fees offered in various bids. Block 316 may include comparing two incoming bids from different advertisers, and may also include comparing one incoming bid from one advertiser with another bid previously accepted from another advertiser.

Returning to decision block 312, if a given incoming bid does not compete with any other incoming or previously-accepted bids, the process flows 300 may take No branch 318 to bypass block 316. In this scenario, the given incoming bid is not compete or conflict with any other bids for a given keyword in a given geographic area, and may by default win the right to respond to that keyword within the area.

Block 320 represents associating an advertiser who submitted a winning bid with the keyword included in the winning bid. In addition, block 322 represents associating the winning advertiser with the geographic region or area specified in the winning bid. It is noted that blocks 320 and 322 may be performed in a relationship with one another, whether in series or in parallel.

The process flows 300 shown in FIG. 3 may result in defining the data stored within the advertising database 210 shown in FIG. 2. More specifically, the process flows 300 may define the various relationships between the keyword representations 216, the area representations 218, and the advertiser representations 220. It is also noted that the process flows 300 may be repeated, as represented generally by the arrows joining block 320 and 322 with block 302. Thus, the process flows 300 may perform continuously on the advertising server 102.

Having described the process flows 300 by which the advertising server 102 may facilitate bidding processes among advertisers, the discussion now turns to a description of components and process flows occurring on the mobile devices. This description is now provided with FIG. 4.

Figure 4:
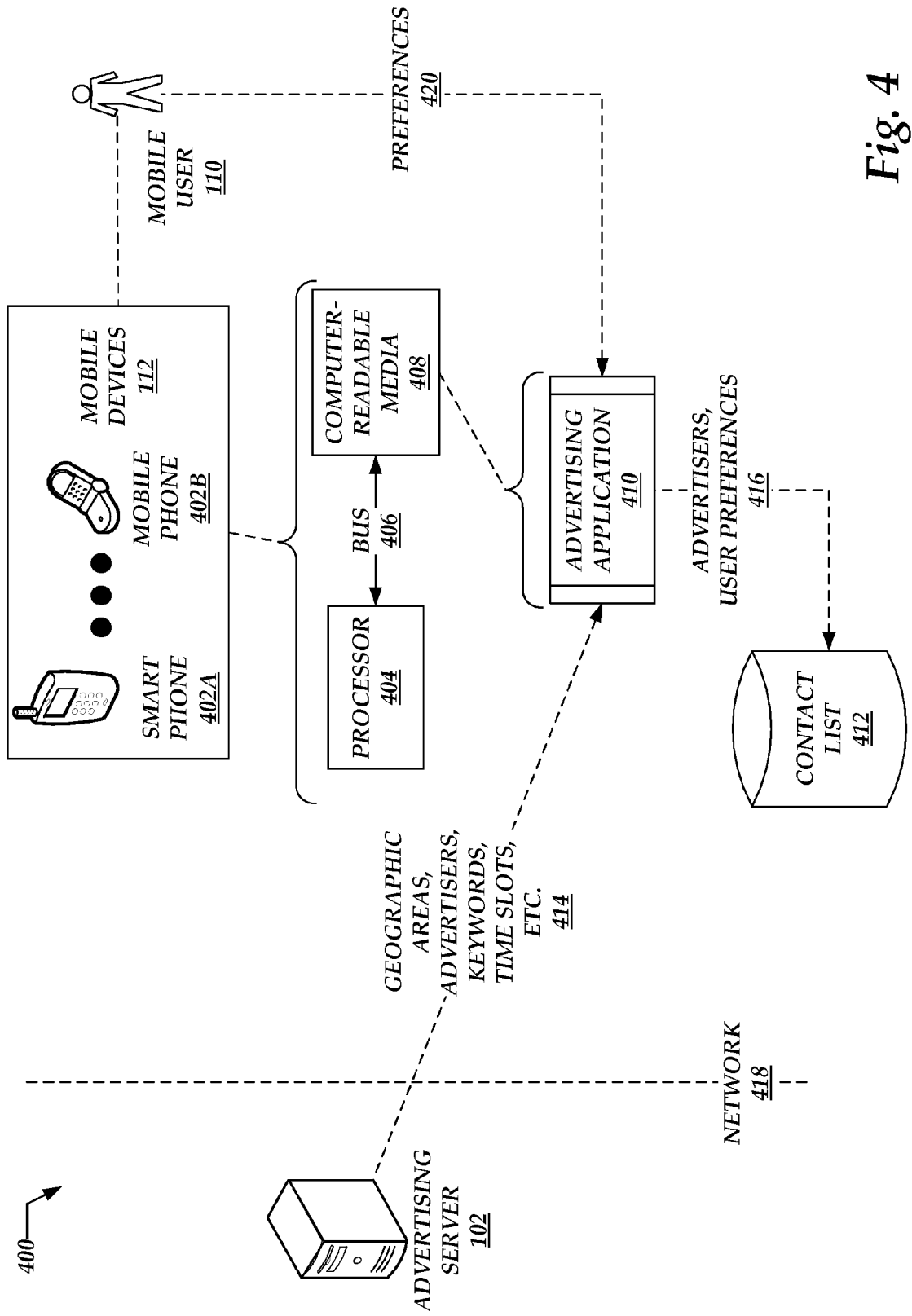
FIG. 4 is a combined block and flow diagram illustrating components and related process flows occurring on mobile devices in connection with managing advertising services for mobile devices and users, according to exemplary embodiments.

FIG. 4 illustrates components and process flows, denoted generally at 400, occurring on mobile devices in connection with managing advertising services for mobile devices and users. For convenience of description, but not to limit possible implementations, FIG. 4 may carry forward some items introduced in previous drawings, and may refer to such items by identical reference numbers. For example, FIG. 4 carries forward the advertising server 102 and the mobile user 110 from previous drawings.

In some implementation scenarios, a telecommunications services provider may operate one or more instances of the advertising server 102, to provide advertising services by which advertisers (e.g., 108 in FIG. 1) may advertise to mobile users 110. For example, the mobile users 110 may subscribe to wireless telecommunications services offered by the services provider, and may receive mobile communications devices 112 in connection with such services. In turn, the mobile users 110 may receive advertisements from the advertisers via the mobile devices 112.

Turning to the mobile devices 112 in more detail, FIG. 4 provides several examples of such devices, with these examples including, but not limited to: wireless personal digital assistants (PDAs) or "smart" phones 402a, mobile or cellular telephones 402b, or other similar mobile devices, denoted generally at 112.

The mobile devices 112 may include one or more processors 404, which may have a particular type or architecture, chosen as appropriate for particular implementations. The processors 404 may couple to one or more bus systems 406 chosen for compatibility with the processors 404.

The mobile devices 112 may also include one or more instances of computer-readable storage media 408, which couple to the bus systems 406. The bus systems 406 may enable the processors 404 to read code and/or data to/from the computer-readable storage media 408. The media 408 may represent storage elements implemented using any suitable technology, including but not limited to semiconductors, magnetic materials, optics, or the like. The media 408 may include memory components, whether classified as RAM, ROM, flash, or other types, and may also represent hard disk drives.

The storage media 408 may include one or more modules of instructions that, when loaded into the processor 402 and executed, cause the mobile devices 112 to perform various techniques for providing managing advertising services for mobile devices and users. In these scenarios, the mobile devices 112 may operate as clients, cooperating with the advertising server 102 or other servers. As detailed throughout this description, these modules of instructions may also provide various means by which the mobile devices 112 may participate in the techniques for managing advertising services, using the components, flows, and data structures described in more detail throughout this description.

As shown in FIG. 4, these modules of instructions may include a client-side advertising application 410, which may be loaded or installed into the mobile devices 112 at the time of manufacture, or afterwards when the mobile devices are issued to particular subscribers (e.g., mobile users 110). The advertising application 410 may interact with a client-side contact list 412, which is described in further detail in FIG. 5 below.

In general, the advertising application 410 may receive information, represented generally at 414, that is loaded from the advertising server 102 at the time the mobile device 112 is issued to the mobile user 110, or at any time afterwards. In turn, the advertising application 410 may populate the contact list 412 with the information 414 loaded from the advertising server, as represented generally at 416. This information 416 may represent different geographic regions or areas through which the mobile device 112 may travel, along with any advertisers who have bid for and won the right to respond to keywords activated within those geographic areas. The information 414 may also include representations of time slots for which particular advertisers have bid for and won the right to present advertisements, within those geographic areas.

In addition, as discussed elsewhere herein, particular advertisers may bid for the right to present advertisements to mobile users 110 who have subscribed to particular levels of plans, or to particular features. In these scenarios, the information 414 may indicate any such advertisers who have won the right to present advertisements to mobile users 110 that subscribe to given plan levels or features.

In the example shown, the mobile devices 112 and the advertising servers 102 may communicate over one or more intermediate networks 418, which generally represent any protocols, adapters, components, and other general infrastructure associated with wired and/or wireless communications networks. Such networks 418 may be global, regional, local, and/or personal in scope and nature, as appropriate in different implementations, and may be configured as appropriate to transmit voice and/or data.

In addition, the advertising application 410 may enable the mobile user 110 to specify any number of preferences 420. In some cases, these preferences 420 may provide a mechanism through which advertisements from the advertisers are filtered. for example, continuing the pizza and pizzeria examples discussed above, a given mobile user 110 may specify through the preferences 420 that he or she is not interested in receiving advertisements from a given pizza chain. In another example, the mobile user may specify that he or she wishes to receive advertisements only from certain enumerated pizza chains. However, it is noted that these examples are illustrative, rather than limiting, and that other examples of preferences are described below.

Having described the components and process flows 400 occurring on the mobile devices in connection with FIG. 4, the discussion now proceeds to a more detailed description of the contact list 412, along with a description of how the contact list may be updated as the mobile device changes locations. This description is now provided with FIG. 5.

Figure 5:
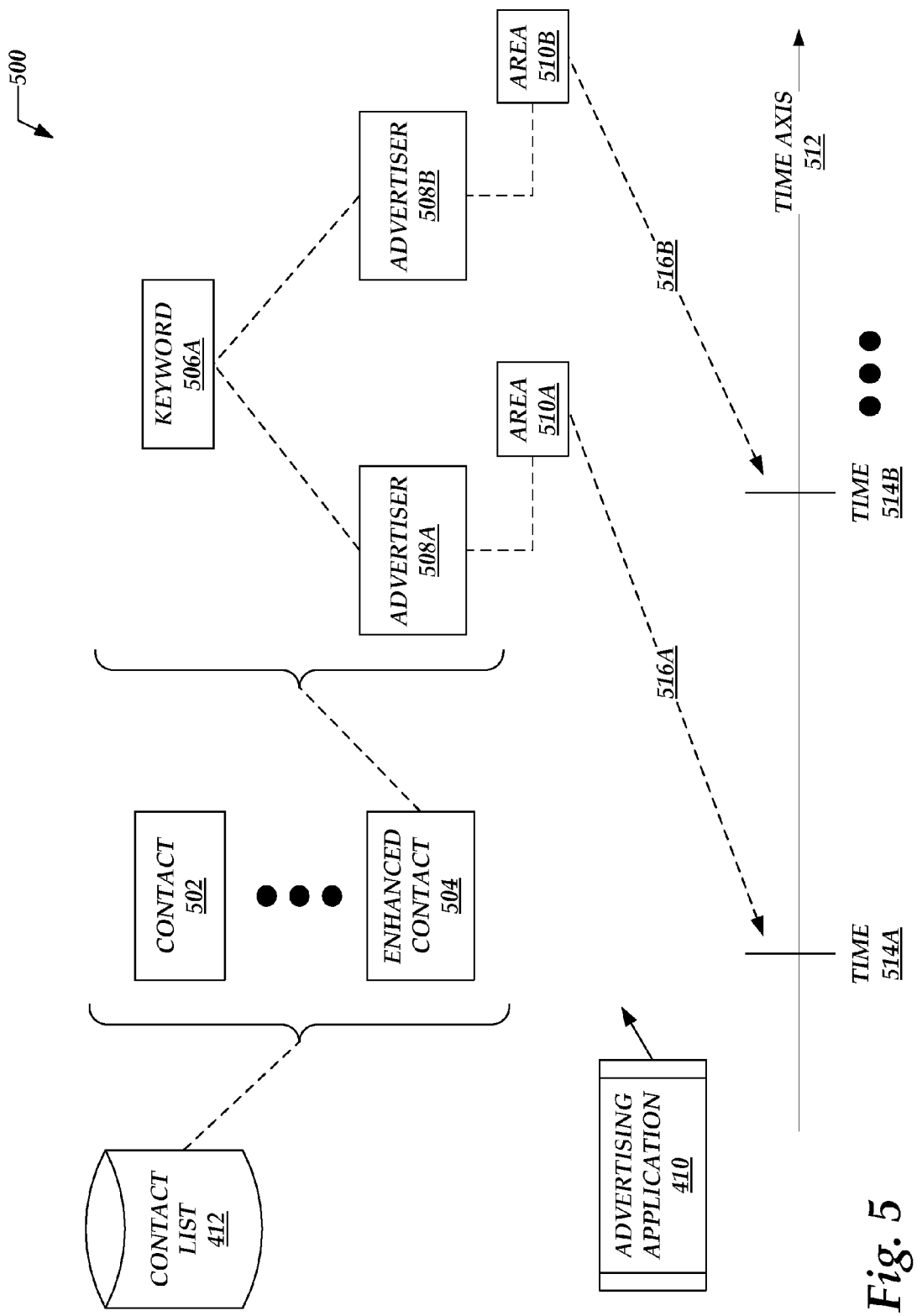
FIG. 5 is a block diagram illustrating data structures relating to a contact list contained within a mobile device, and also illustrating how enhanced contacts within this data structure may update dynamically when mobile devices change geographic locations, according to exemplary embodiments.

FIG. 5 illustrates data structures, denoted generally at 500, relating to a contact list contained within a mobile device. More specifically, FIG. 5 illustrates enhanced contacts included within the contact list, and also illustrates how the enhanced contacts may be updated dynamically as the mobile device changes locations.

For convenience of description, but not to limit possible implementations, FIG. 5 may carry forward some items introduced in previous drawings, and may refer to such items by identical reference numbers. For example, FIG. 5 carries forward an example of the contact list at 412, which may be modified and maintained by the advertising application 410 as the mobile device moves through different geographic areas.

Turning to the contact list 412 in more detail, it may be implemented as an address book, or other suitable data structure within a given mobile device (e.g., 112 in previous figures). The contact list 412 may include any number of contacts 502, which may contain, for example, names, titles, telephone numbers, fax numbers, e-mail addresses, physical or network addresses, or other similar contact information for particular persons with whom a given user may communicate. The contact list 412 may also include any number of enhanced contacts 504, which may be visually identified in some manner to differentiate them from the contacts 502. In addition, the enhanced contacts 504 may contain relatively generic names or designations, as compared to the more specific names contained in the contacts 502. For example, continuing the description of the pizzeria scenario discussed above, an example of the enhanced contacts 504 may be labeled or identified generically as "pizza", while an example of the contacts 502 may be labeled or identified more specifically as DOMINOS®, PIZZA HUT®, or other brands of pizza.

The enhanced contacts 504 may, in turn, may include representations 506 of any number of keywords. Recalling the description of FIG. 4, these keywords may include keywords that are downloaded automatically to the mobile device as part of the information flows 414. These information flows 414 may occur when the mobile device is initially provisioned and provided to a subscriber (e.g., mobile user 110). However, these keywords may also include keywords that the subscriber manually creates.

Within the enhanced contact 504, the keyword representation 506 may be associated with an advertiser representation 508*a* and an area representation 510*a*. For example, as represented on a time axis 512, the mobile device may be within a first geographic area at a first given time 514*a*. Within this first geographic area, assume that a first advertiser has bid for and won the right to advertise to mobile users within this first geographic area. More specifically, the first advertiser may advertise by responding to users when they activate a given keyword on their mobile devices while within this first geographic area.

At the first time 514*a*, the advertising application 410 may configure the enhanced contact 504 so that the advertiser representation 508*a* contains a representation of the first advertiser. The advertising application 410 may also configure the area representation 510*a* to correspond to the first geographic area, and may relate the advertiser representation 508*a* and the area representation 510*a* to indicate that the corresponding advertiser has the right to respond to the keyword within the first geographic area. FIG. 5 generally represents these relationships by the dashed line 516.

At a second given time 514*b*, the mobile device may have left the first geographic area and moved to a second geographic area. Within this second geographic area, assume that a second advertiser has bid for and won the right to advertise to mobile users within this second geographic area. More specifically, the second advertiser may advertise by responding to users when they activate the keyword on their mobile devices while within this second geographic area.

At the second time 514*a*, the advertising application 410 may detect this transition to the second geographic area, and may configure the enhanced contact 504 so that an advertiser representation 508*b* contains a representation of the second advertiser. The advertising application 410 may also configure an area representation 510*b* to correspond to the second geographic area, and may relate the advertiser representation 508*b* and the area representation 510*b* to indicate that the corresponding advertiser has the right to respond to the keyword within the second geographic area. FIG. 5 generally represents these relationships by the dashed line 516*b*.

In the foregoing manner, the advertising application 410 may dynamically update any number of the enhanced contacts 504 to associate different advertisers with given keywords as the mobile device passes through different geographic areas. Although FIG. 5 illustrates examples of transitioning between two different geographic areas, it is noted that this scenario may readily be extended to any number of different geographic areas.

Having described the illustrates data structures 500 relating to the enhanced contacts contained within a mobile device, the discussion now proceeds to a description of process flows for dynamically updating the enhanced contacts as the mobile device changes locations. This description is now provided with FIG. 6.

Figure 6:
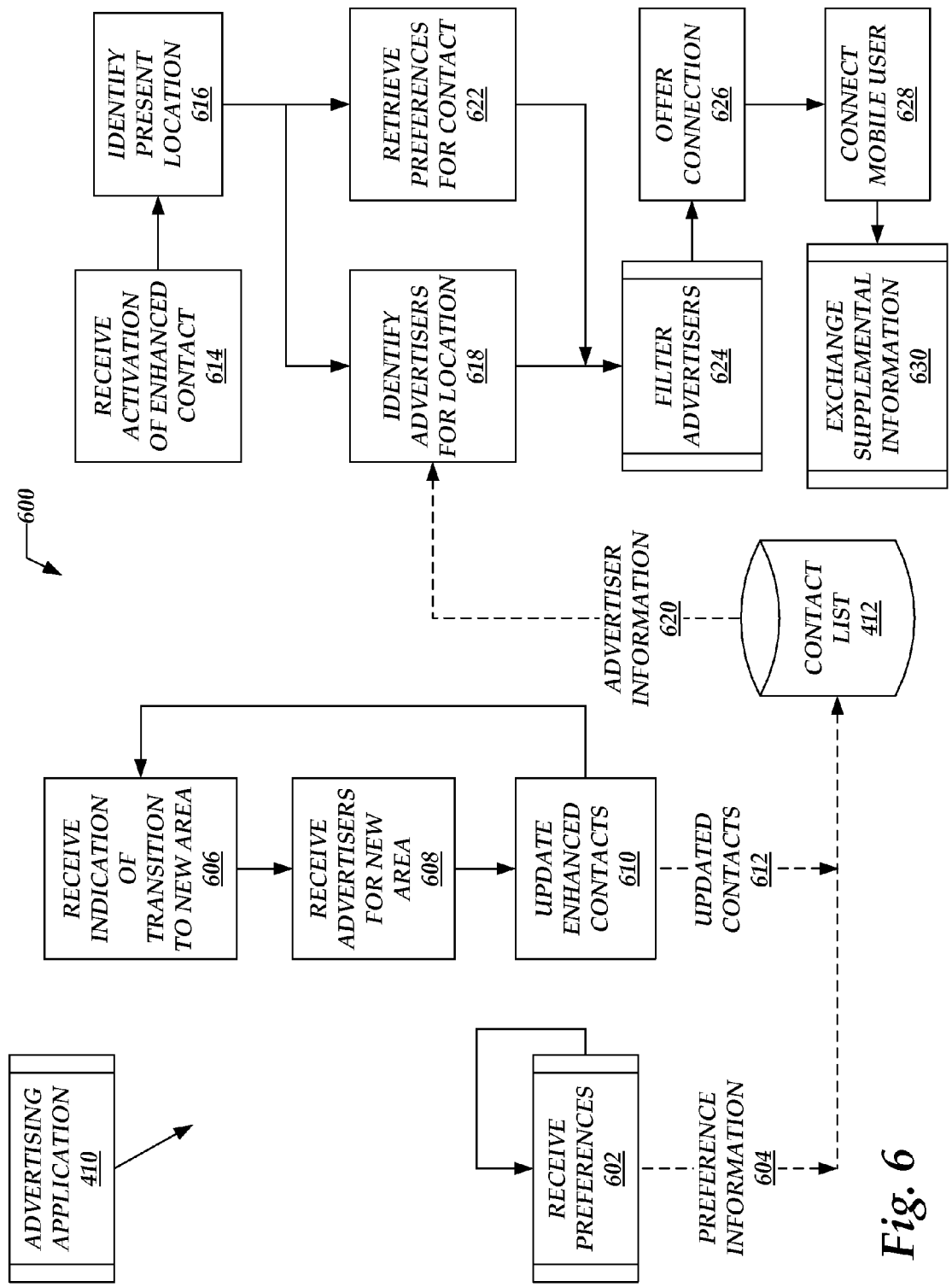
FIG. 6 is a flow diagram illustrating processes for dynamically updating the enhanced contacts within the contact list, as the mobile device changes geographic locations, according to exemplary embodiments.

FIG. 6 illustrates process flows, denoted generally at 600, for dynamically updating enhanced contacts within a contact list contained in a mobile device, as the mobile device changes geographic locations. For ease of description, but not to limit possible implementations, the process flows 600 are described in connection with the advertising application 410 described above with FIG. 4. However, it is noted that implementations of the process flows 600 may perform with other applications or components without departing from the scope and spirit of this description.

Turning to the process flows 600 in more detail, block 602 represents receiving preference information from mobile users (e.g., 110) associated with the mobile devices running the advertising application 410. In general, block 602 may include receiving preference information used to filter advertisements from advertisers, before presenting them to the mobile users.

As noted above, examples of these preferences may include particular advertisers favored or disfavored by particular mobile users. For example, if a given mobile user would not be interested in advertisements from a given advertiser under any circumstances, the preference information may so indicate, and advertisements from this given advertiser would be filtered-out and not presented to this mobile user. In another example, if the given mobile user would be interested in advertisements only from the given advertiser, the preference information may so indicate, and advertisements from any other advertisers would be filtered-out and not presented to this mobile user.

In providing the above examples of preference information, it is noted that other examples of preference information and related processing and filtering are possible, without departing in the scope and spirit of this description. It is also noted that block 602 may be performed as part of an ongoing or continuous process performed by the advertising application 410 in parallel with other processing, as shown in the example scenario in FIG. 6. FIG. 6 generally represents any new or updated reference information at 604, as output from block 602.

As described above, a given mobile device may move between different geographic regions or areas, and different advertisers may have different rights to advertise by responding to keywords within these different regions or areas. Accordingly, block 606 represents the advertising application 410 receiving an indication that a given mobile device as change location into a new geographic area or region. For example, mobile devices may provide the ability to determine their present locations, based on triangulation techniques or other techniques that involve communicating with cellular towers or other infrastructure. Using any of these techniques, block 606 may determine that a given mobile device has moved from one geographic area or region to another one.

Once the given mobile device has transition from one geographic region or area to another one, it is possible that the set of advertisers who are qualified to respond to keyword activations may have changed. Accordingly, block 608 represents receiving notifications or indications of the set of advertisers who have bid for and won current rights to respond to keyword activations within the present geographic location. For example, referring briefly back to FIG. 4, block 608 may include receiving this information as part of the data flows represented at 414. Block 608 may also include receiving this information from an advertising server 102 maintained by or on behalf of a telecommunications services provider Block 610 represents updating any enhanced contacts (e.g., 504 in FIG. 5) in response to the advertiser information received in block 608. FIG. 6 represents these updated contacts generally at 612. In turn, the advertising application 410 may update the contact list 412 (carried forward from FIG. 4) with the updated contacts 612 and/or the preference information 604, as these updates become available.

It is noted that the advertising application may perform blocks 606, 608, and 610 as part of a sub-process that is executed when the mobile device transitions between geographic locations (i.e., regions, areas, or the like). As such, the advertising application may perform blocks 606-610 asynchronously to and independently from block 602, as indicated in FIG. 6.

Block 614 represents receiving notification that a mobile user has activated an enhanced contact on the mobile device. For example, in implementations in which the mobile device provides voice recognition capabilities, block 614 may include receiving notification that the mobile user has spoken a generic term or keyword associated with the enhanced contact (e.g., "pizza"). In other examples, block 614 may include receiving notification that the mobile user has navigated through the contact list to a given enhanced contact, and has activated the enhanced contact by selecting a keyword associated with the contact. A selection process may involve use of a stylus, keypad mechanism, or other suitable input mechanism.

Block 616 represents identifying a present geographic location of the mobile device, when the enhanced contact was activated in block 614. As noted above, block 616 may include using triangulation capabilities or other techniques to determine the present physical location of the mobile device.

Having established the current location of the mobile device when the enhanced contact and related keyword are activated, block 618 represents identifying one or more advertisers who have acquired the right to respond to the keyword when activated within the current location. Recalling above description, different advertisers may bid for and win the right to respond to activations of different keywords within different geographic areas. Accordingly, block 618 may include identifying any such advertisers who have obtained the right to respond to the activated keyword. Block 618 may include retrieving information 620 identifying such advertisers from one or more data storage elements, such as the contact list 412. However, this advertiser information 620 may be stored in structures other than the contact list 412 without departing from the scope and spirit of this description.

Block 622 represents retrieving any preference information applicable to the enhanced contact or keyword activated in block 614. For example, block 622 may include retrieving preference information specified by an end-user from suitable data storage elements, as received previously in block 602.

Block 624 represents filtering the advertisers identified in block 618, in light of any preference information specified by the mobile user. In some cases, the mobile user may not specify any preferences, in which case none of the advertisers identified in block 618 are filtered-out. In other cases, the mobile user may specify particular preference information, in which case one or more of the identified advertisers may be filtered-out in block 624. Block 624 may include filtering advertisers based on time slots on which the advertisers have bid. For example, multiple advertisers may have won the right to advertise to a given mobile user when the user is within a given geographic region, but different advertisers may have bid for different slots of time while the mobile user is in the geographic zone.

Block 626 represents the advertising application offering to create a communications connection between the mobile user and one or more of the advertisers output from the filtering process represented in block 624. In some scenarios, block 626 may include offering to open a voice-based communication between the mobile user and the advertiser, with this voice communication being initiated by either the mobile user or the advertiser. In other scenarios, block 626 may include offering to initiate a data-based communication between the mobile user and the advertiser. More specifically, block 626 may include offering to initiate an e-mail-based exchange between the parties, a text message-based exchange, an instant message (IM) exchange, or other suitable communication mechanism. In some cases, block 626 may include offering to create a session between the mobile user and the advertiser, with this session enabling simultaneous voice and/or data-based communications.

Block 626 may include creating a suitable user interface (UI) that is presented on the mobile device, enabling the user may respond affirmatively or negatively to the offer. For example, the UI created in block 626 may include one or more softkeys that are responsive to user input to initiate the connection between the mobile user and the advertiser, as well as one or more softkeys that are responsive to user input to decline this connection.

Assuming that the mobile user responds affirmatively to initiate the connection with the advertiser, block 628 represents placing the mobile user and the advertiser in communication with one another. As described above, various voice or data-based communications mechanisms are possible, and block 628 may include connecting the mobile user and the advertiser using any of these or other communications mechanisms.

Block 630 represents exchanging supplemental information in connection with the communication initiated in block 628. The supplemental information may take a variety of different forms, as now discussed further in connection with FIGS. 7 and 8.

Figure 7:
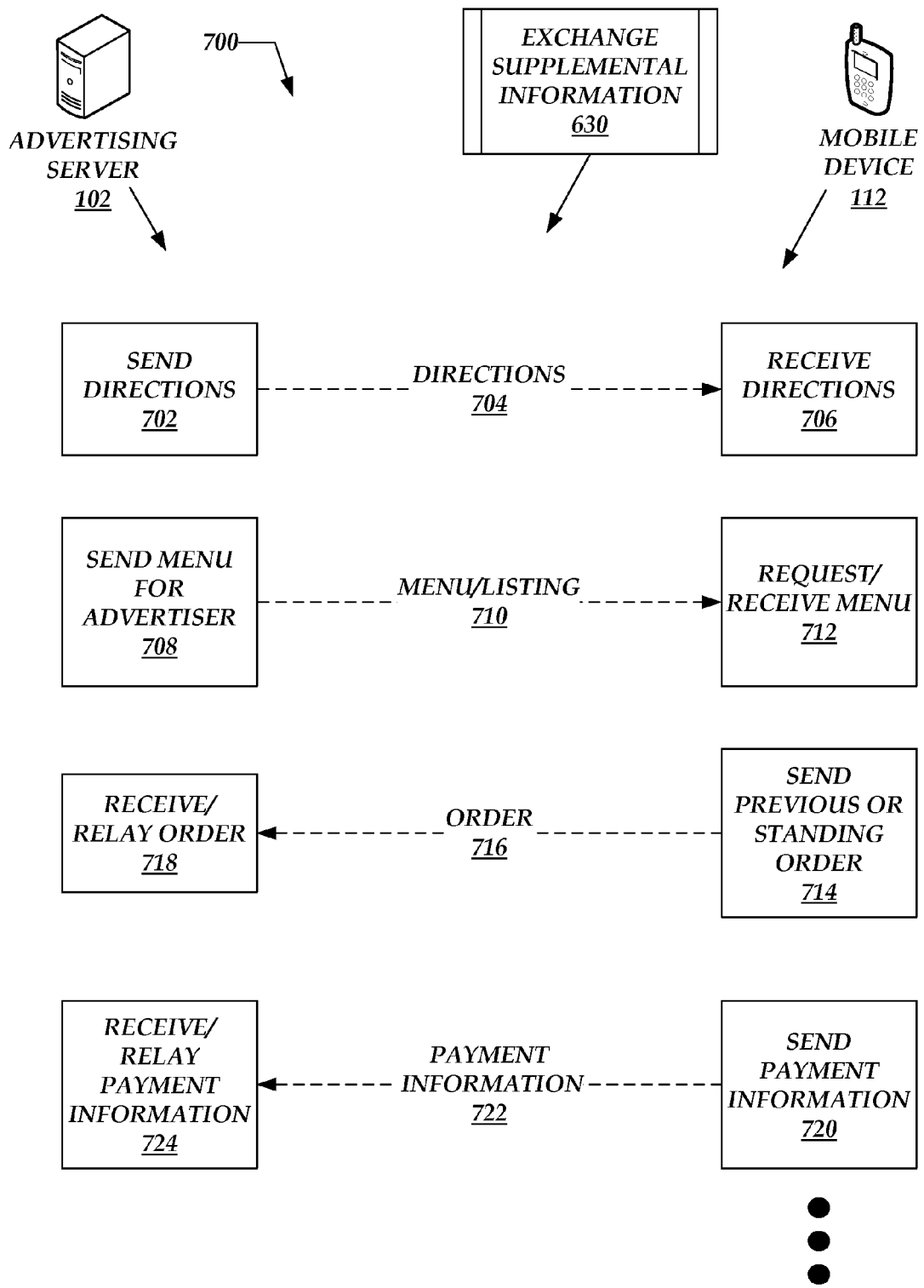
FIG. 7 is a flow diagram illustrating processes for exchanging information supplemental to communications between a given mobile user and an advertiser, according to exemplary embodiments.

FIG. 7 illustrates additional process flows, represented generally at 700, related to exchanging information supplemental to communications between a given mobile user and an advertiser. For ease of description, but not to limit possible implementations, the process flows 700 are described in connection with the advertising server 102 and the mobile device 112. However, it is noted that more since of the process flows 700 may be implemented using other devices or systems without departing from the scope and spirit of this description.

Turning to the advertising server 102, block 702 represents sending directions 704 from the current position of the mobile device to a location of the advertiser. Depending on the current distance between the mobile device and the advertiser, these directions may be tailored for driving, walking, or other modes of transportation.

At the mobile device 112, block 706 represents receiving the directions 704. In this manner, the directions 704 may provide a form of supplemental information that enables a mobile user (e.g., 110) to locate an advertiser. The directions 704 may be sent before, after, or during communications with the advertiser over the mobile device 112.

Referring back to the advertising server 102, block 708 represents sending a menu or other listing of goods and/or services (collectively, "items") 710 to the mobile device 112. More specifically, the menu 710 may provide a list of items available from an advertiser who response to a given activated keyword (e.g., "pizza"). In addition, block 708 may include sending promotional information (e.g., coupons, discounts, specials, or the like) to the mobile device 112.

In some cases, this promotional information may be tailored for particular customers who may be associated with the mobile devices 112. For example, if the mobile devices 112 are associated with frequent or favored customers of a given advertiser, the promotional information may be customized for such customers.

At the mobile device 112, block 712 represents receiving the menu or item listing 710 from the advertising server. In some cases, the mobile device 112 may affirmatively request the menu or item listing, as also represented in block 712. In other cases, the advertising server 102 may push the menu or item listing 710 to the mobile device, without an explicit request from the mobile device.

From the mobile device 112, block 714 represents sending a representation of a previous or standing order 716 associated with a given merchant or advertiser. For example, if a given customer places a recurring order with a given advertiser (e.g., a pizza with certain toppings), the mobile device 112 may store a representation of this order 716, and send this representation to the advertising server 102. In this manner, the order representation 716 may relieve the mobile user from manually or verbally communicating a frequently-recurring order to an advertising merchant.

At the advertising server 102, block 718 represents receiving the order information 716. In turn, block 718 may also represent forwarding or relaying this order to the advertising merchant.

Returning to the mobile device 112, block 720 represents sending payment information 722 from the mobile device. For example, the payment information 722 may include bank or credit card account information, and may be encrypted as appropriate in different implementations. In this manner, the mobile device 112 may store this payment information securely, and relieve the mobile user from manually or verbally communicating this payment information to an advertising merchant.

At the advertising server 102, block 724 represents receiving the payment information 722, as received from the mobile device 112. In some cases, the advertising server 102 may serve as an intermediary between the mobile device 112 and the advertiser. In such cases, block 724 may include relaying or forwarding the payment information to the advertising merchant.

Figure 8:
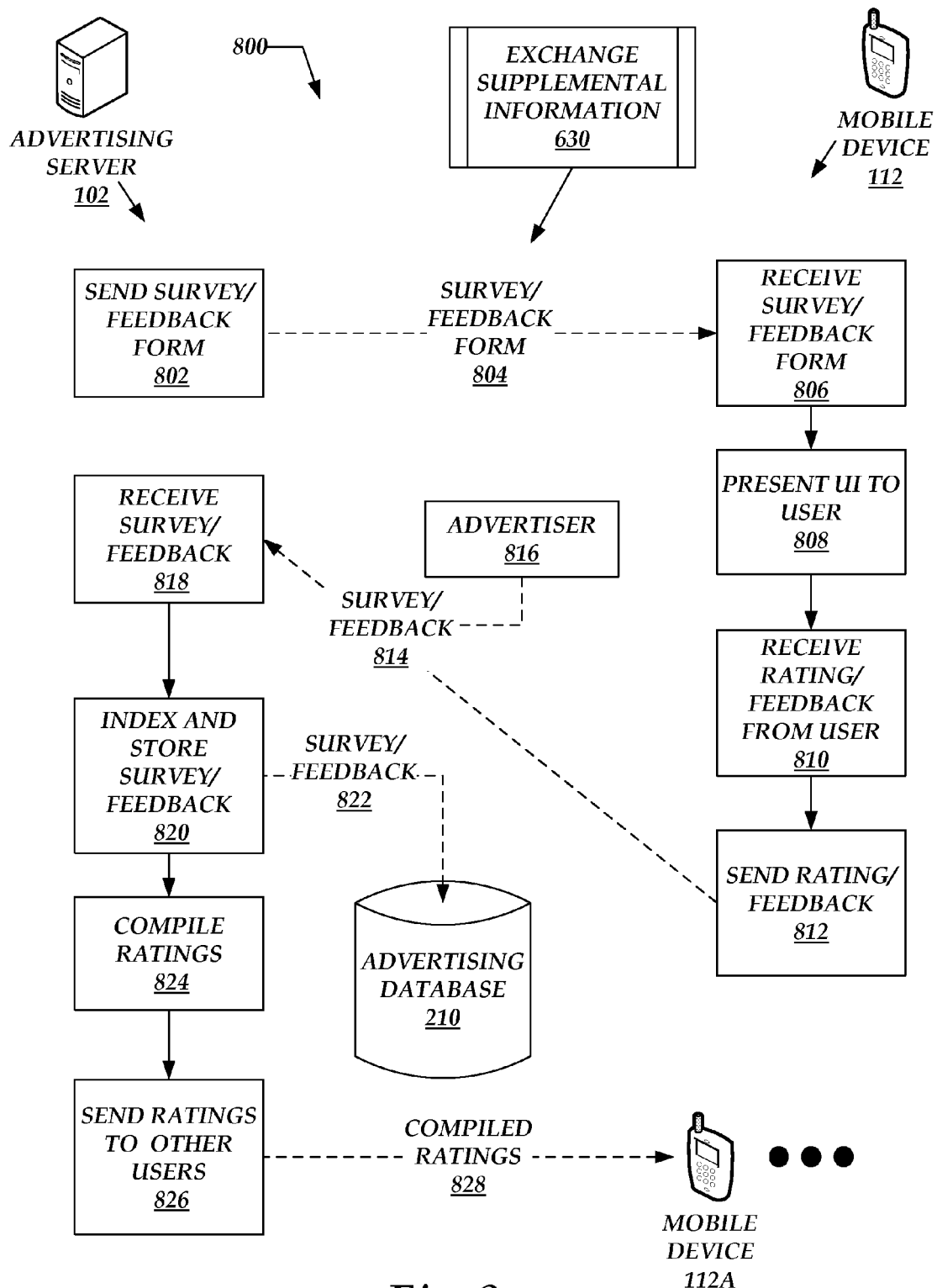
FIG. 8 is a flow diagram illustrating processes for requesting, collecting, and distributing survey or feedback information from mobile users and mobile devices, according to exemplary embodiments.

FIG. 8 illustrates additional process flows, represented generally at 800, related to requesting, collecting, and distributing survey or feedback information from mobile users and mobile devices. This survey or feedback data may be part of the supplemental information exchanged between the mobile users and advertisers. For ease of description, but not to limit possible implementations, the process flows 800 are also described in connection with the advertising server 102 and the mobile device 112. However, it is noted that more since of the process flows 800 may be implemented using other devices or systems without departing from the scope and spirit of this description.

At the advertising server 102, block 802 represents sending a request for the survey or feedback information. For example, block 802 may include sending a feedback or survey form 804 to the mobile device. At the mobile device, block 806 represents receiving the survey or feedback form 804. Using this feedback form 804, the mobile user may provide comments or other information related to a transaction consummated with a given advertising merchant.

Block 808 represents presenting a user interface (UI) incorporating the survey or feedback form received in block 806. The mobile user may interact with the UI to provide the survey or feedback information requested by the form. In turn, block 810 represents receiving this rating or feedback information from the mobile user, and block 812 represents sending rating or feedback information 814 from the mobile device 112. As shown in FIG. 8, the survey information 814 may include a representation 816 of an advertiser on which the mobile user is providing feedback.

At the advertising server 102, block 818 represents receiving the survey or feedback information 814. In turn, block 820 represents indexing and storing the survey or feedback information received in block 818. For example, block 820 may include organizing this feedback information by advertiser, and storing it in a suitable data structure. FIG. 8 provides an example in which this feedback information is stored in the advertising database 210, but the feedback information may be stored in other data structures as well. FIG. 8 denotes at 822 the survey or feedback information as indexed and stored in the advertising database 210.

Block 824 represents compiling ratings for different given advertisers or merchants, based on survey or feedback information collected from different mobile users. In some cases, the entity that operates the advertising server 102 (e.g., a telecommunications services provider) may make the compiled rating information available to advertisers, merchants, or other third parties, in exchange for a fee or other compensation. In addition, the underlying survey or feedback information used to compile the ratings information may also be made available to third parties, in exchange for suitable compensation. In this manner, the advertising server 102 may enable advertisers to research feedback and ratings received from their mobile customers. Additionally, franchisors or other managing entities may use this feedback and rating information to identify underperforming merchants.

Block 826 represents sending rating information 828 as compiled for particular merchants to other mobile users or mobile devices. FIG. 8 provides an example of another such mobile device at 112*a*. For example, as discussed in further detail with FIG. 9, various mobile users can establish preferences that are used to filter advertisements that are presented to these mobile users. The rating information 828 compiled for particular advertisers or merchants may enable these other mobile devices to filter advertisements from these merchants according to preferences specified by these other mobile users.

Figure 9:
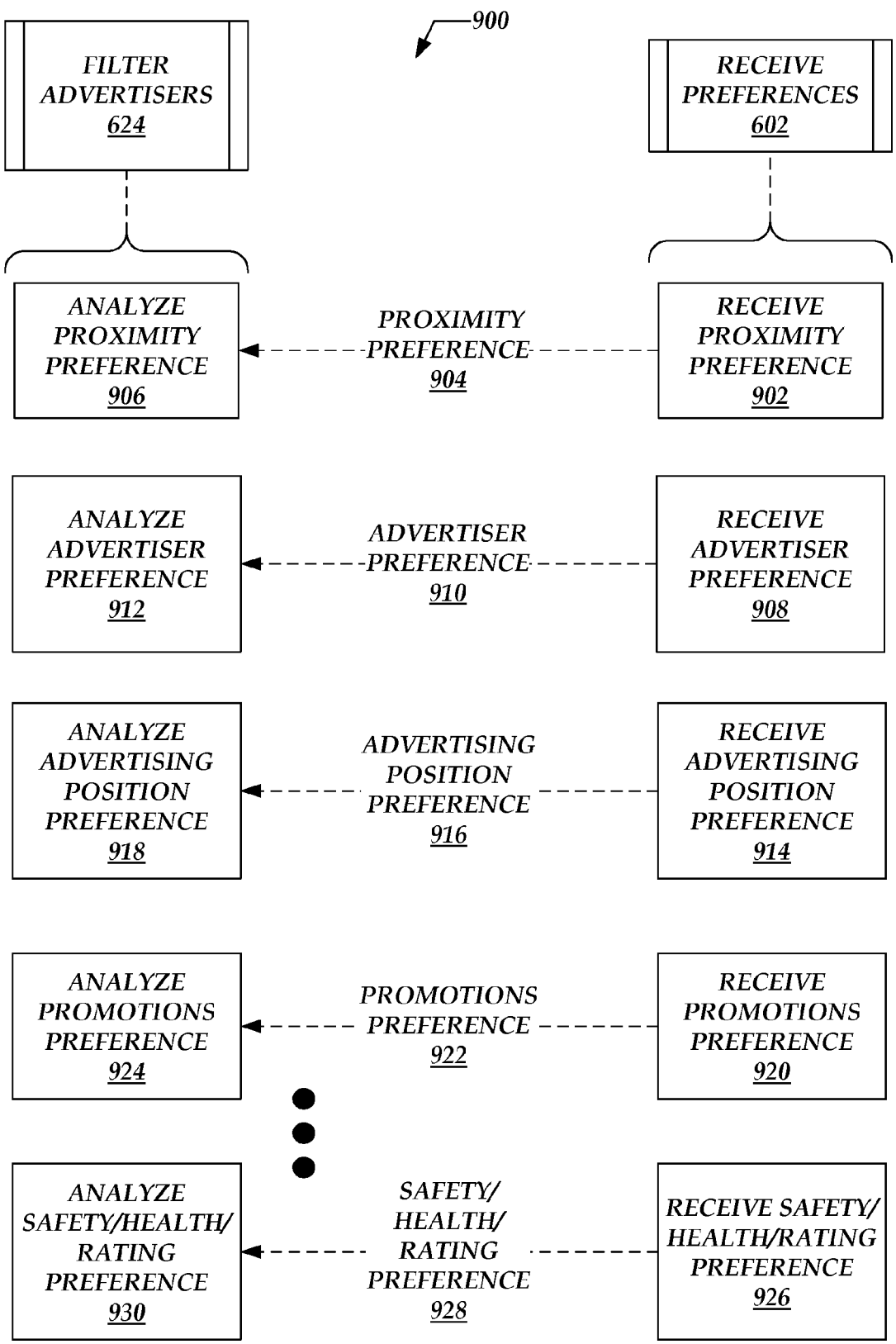
FIG. 9 is a flow diagram illustrating processes for receiving preferences specified by mobile users, and for filtering processes that may utilize such preferences, according to exemplary embodiments.

FIG. 9 illustrates process flows, denoted generally at 900, for receiving preferences specified by mobile users, and filtering processes that may utilize such preferences. Without limiting possible implementations, the process flows 900 may elaborate further on blocks 602 and 624 as shown in FIG. 6. Recalling previous description, block 602 represents receiving preferences from a mobile user, while block 624 represents filtering advertisers based at least in part on these preferences.

Turning first to block 602 (receiving preferences), block 902 represents receiving proximity preferences from the mobile users. For example, block 902 may include receiving a proximity preference that specifies how close a responding advertiser is to be, relative to a mobile user's present position, when the user activates a given keyword on his or her mobile device. For example, a user may specify that any that he or she responding advertisers are to be within a five-mile radius from his or her present location, when the user activates the keyword.

It is noted that users may vary this proximity preference, depending on their localities. For example, users living in densely-populated urban areas may specify relatively low proximity preferences, since more advertisers would be nearby in such areas. In another example, users living in more sparsely-populated suburban or rural areas may specify increased proximity preferences, since fewer advertisers would be nearby in such areas.

FIG. 9 provides an example of proximity preferences at 904. Block 902 may include communicating these proximity preferences to block 906, which represents analyzing these proximity preferences when filtering advertisers for presentation to the mobile users. For example, block 906 may include filtering-out any advertisers whose locations do not fall within the applicable proximity preferences specified by a given mobile user.

Returning to block 602, block 908 represents receiving any applicable merchant or advertiser preferences as specified by a given mobile user. For example, certain mobile users may or may not wish to conduct transactions with certain merchants. FIG. 9 represents these advertiser preferences at 910. Block 908 may include sending these advertiser preferences to block 912, which represents analyzing these advertiser preferences when filtering advertisers for presentation to the given mobile user. For example, if the given mobile user indicates through advertiser preferences 910 that he or she does not wish to conduct transactions with a given pizza chain, then block 912 may filter-out any advertisements from representatives of this pizza chain.

In other examples of advertiser preferences, mobile users may indicate whether they prefer to receive advertisements from national-chain type businesses, or locally-owned and operated businesses. Other examples of advertiser preferences 910 are possible as well, without departing from the scope and spirit of the present description.

Block 914 represents receiving an advertising position preference from the mobile user. For example, within a given geographic location, more than one advertiser may bid for and win the right to respond to keywords activated within the geographic location. In these cases, advertisements from these advertisers may be ranked, sorted or otherwise ordered for presentation to the mobile user. However, mobile users may specify that they wish to see only the top-ranked advertisement, or may otherwise specify a cut-off point applicable to presenting ranked advertisements. For example, mobile users may specify that they wish to see only the three top-ranked advertisements, in cases where multiple advertisements are available for a given keyword within a geographic location.

Block 918 represents analyzing and advertising position preferences 916 as specified by a mobile user, when filtering advertisers on a given mobile device. For example, if a given mobile user has indicated that he or she wishes to see only the three top-ranked advertisements, block 918 may include filtering-out any lower-ranked advertisements.

Block 920 represents receiving promotions preferences 922 as specified by the mobile user. For example, some mobile users may wish to receive advertisements only from advertisers who are offering promotions, coupons, specials, or other types of discounts. In such cases, block 924 may include considering or analyzing such promotions preferences 922 when filtering advertisers for presentation to the mobile users. For example, if a given mobile user has indicated that he or she wishes to receive only advertisements that offer some type of coupon or special, block 924 may include filtering-out those advertisements that do not offer some type of coupon or special.

Block 926 represents receiving preferences 928 relating to safety or health factors, or ratings of particular advertising advertisers. For example, some mobile users may not wish to receive advertisements from advertisers located in high-crime areas, from advertisers not achieving some minimum score on health inspections, or that do not achieve some minimum rating based on reviews or feedback from other users. in these scenarios, block 930 represents considering or analyzing factors or ratings relating to safety, health, or customer satisfaction when filtering advertisements from particular advertisers.

Figure 10:
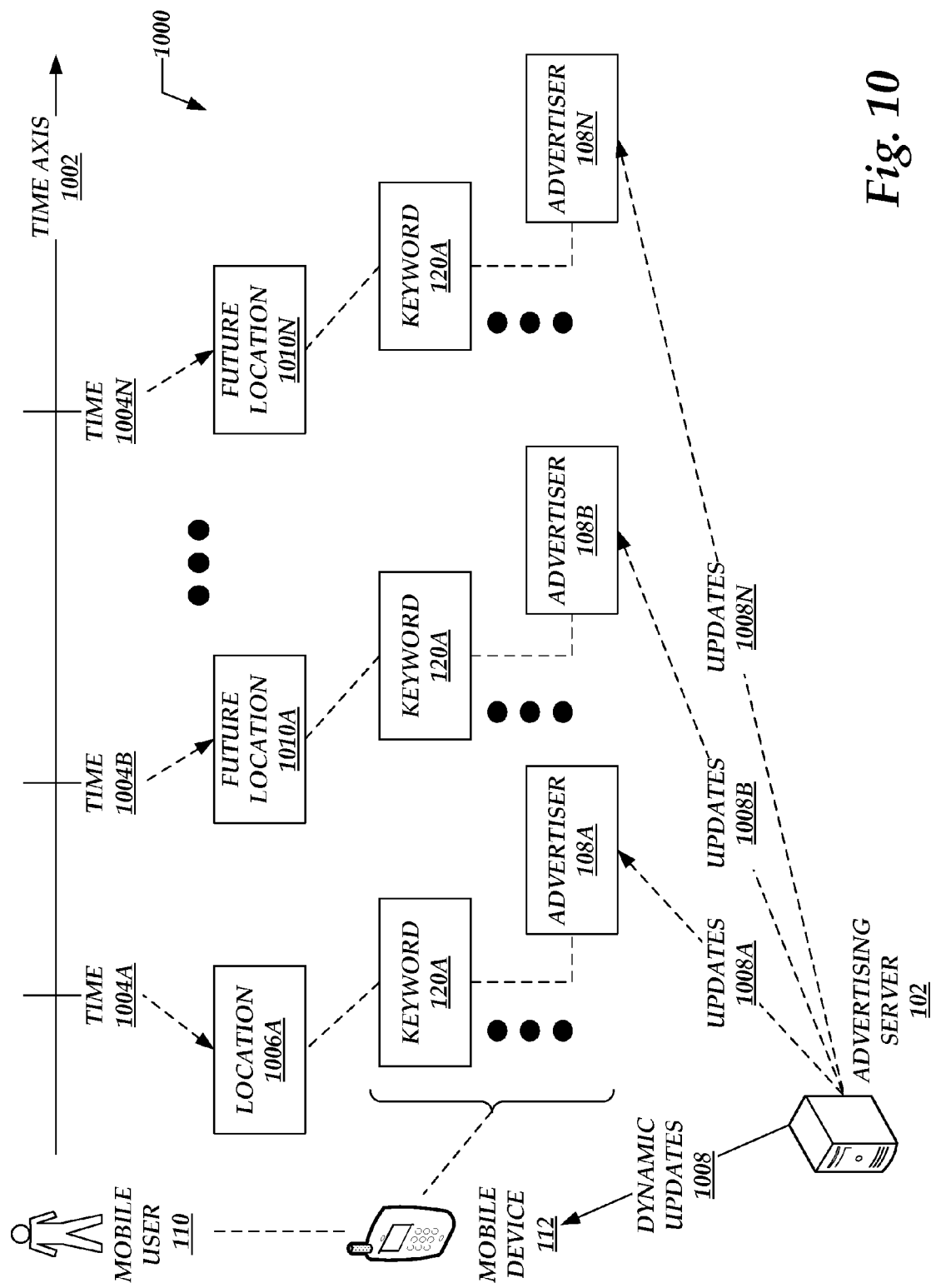
FIG. 10 is a block diagram illustrating components and data flows, for dynamically updating mobile devices as mobile users pass through projected locations.

FIG. 10 illustrates components and data flows, denoted generally at 1000, associated with dynamically updating mobile devices as mobile users pass through projected locations. for ease of reference and description, but not to limit possible implementations, FIG. 10 carries forward an example mobile user at 110, an example mobile device at 112, and an example advertising server at 102.

FIG. 10 includes a representation of a timeline or time axis 1002, with representative times 1004*a*, 1004*b*, and 1004*n* (collectively, times 1004) shown thereon. For example, at the time 1004*a*, the mobile user and mobile device may be at a given location, denoted generally at 1006*a*. This given location 1006*a* may be within the geographic region 104 shown in FIG. 1.

The mobile device 112 may contain or store representations of one or more keywords, carried forward and represented generally at 120a. Using the tools and techniques described above in connection with FIGS. 1-9, the advertising server 102 may associate a given keyword 120a with a particular advertiser, carried forward and represented generally at 108a. When the mobile device 112 is at the location 1006a at the time 1004a, the advertising server may configure the mobile device, such that the keyword representation 120a would be responsive to user input or activation to present advertisements or other materials associated with the advertiser 108a, as represented generally at 1008a.

In addition to configuring the mobile device for the present location 1006a and the present time 1004a, the advertising server may also project one or more future locations 1010a and 1010n (collectively, future or projected locations 1010), through which the mobile user and mobile device may travel. More specifically, the advertising server 102 may project that at time 1004b, the mobile user 110 will be in the future location 1010a, and that at time 1004n, the mobile user 110 will be in the future locations 1010n. For example, the mobile user may be traveling according to a predefined travel itinerary through a variety of different locations. This itinerary may be local, regional, national, or global in scope, in different possible implementation scenarios.

As described in further detail below, the advertising server 102 may update the mobile device 112 for the future location 1010a, as represented generally at 1008b. In addition, the advertising server may update the mobile device or the future location 1010n, as represented generally at 1008n. For example, referring to the example keyword representation 120a, the updates 1008b may associate this keyword with a different advertiser 108b, when and if the mobile device 112 reaches the projected future location 1010a. Similarly, the updates 1008n may associate this keyword with another advertiser 108n, when and if the mobile device 112 reaches the projected future location 1010n.

Recalling the above pizzeria example, the keyword representation 120a may include the term "pizza". When the mobile device is at the actual location 1006a at the time 1004a, the updates 1008a may configure the mobile device so that the keyword "pizza" is responsive to user input or activation to present advertisements or materials related to a first pizzeria (i.e., advertiser 108a). In addition, the advertising server 102 may also project the future locations 1010a and 1010n, along with projected arrival times 1004b and 1004n. The updates 1008b may configure the mobile device 112, such that when and if the mobile user 110 reaches the projected future location 1010a, the keyword "pizza" (i.e., keyword representation 120a) may be associated with a second pizzeria (i.e., advertiser 108b) proximate this future location. Similarly, the updates 1008n may configure the mobile device 112, such that when and if the mobile user reaches the projected future location 1010n, the keyword "pizza" may be associated with another pizzeria (i.e., advertiser 108n) proximate this future location.

FIG. 10 denotes these dynamic updates 1008a-1008n collectively at 1008. It is also noted that any number of these updates 1008 may occur over the timeline 1002, and may be repeated for any number of actual or projected locations. Thus, it is noted that the particular scenario shown in FIG. 10 is presented only to facilitate the present description, but not to limit possible implementations of this description.

Figure 11:
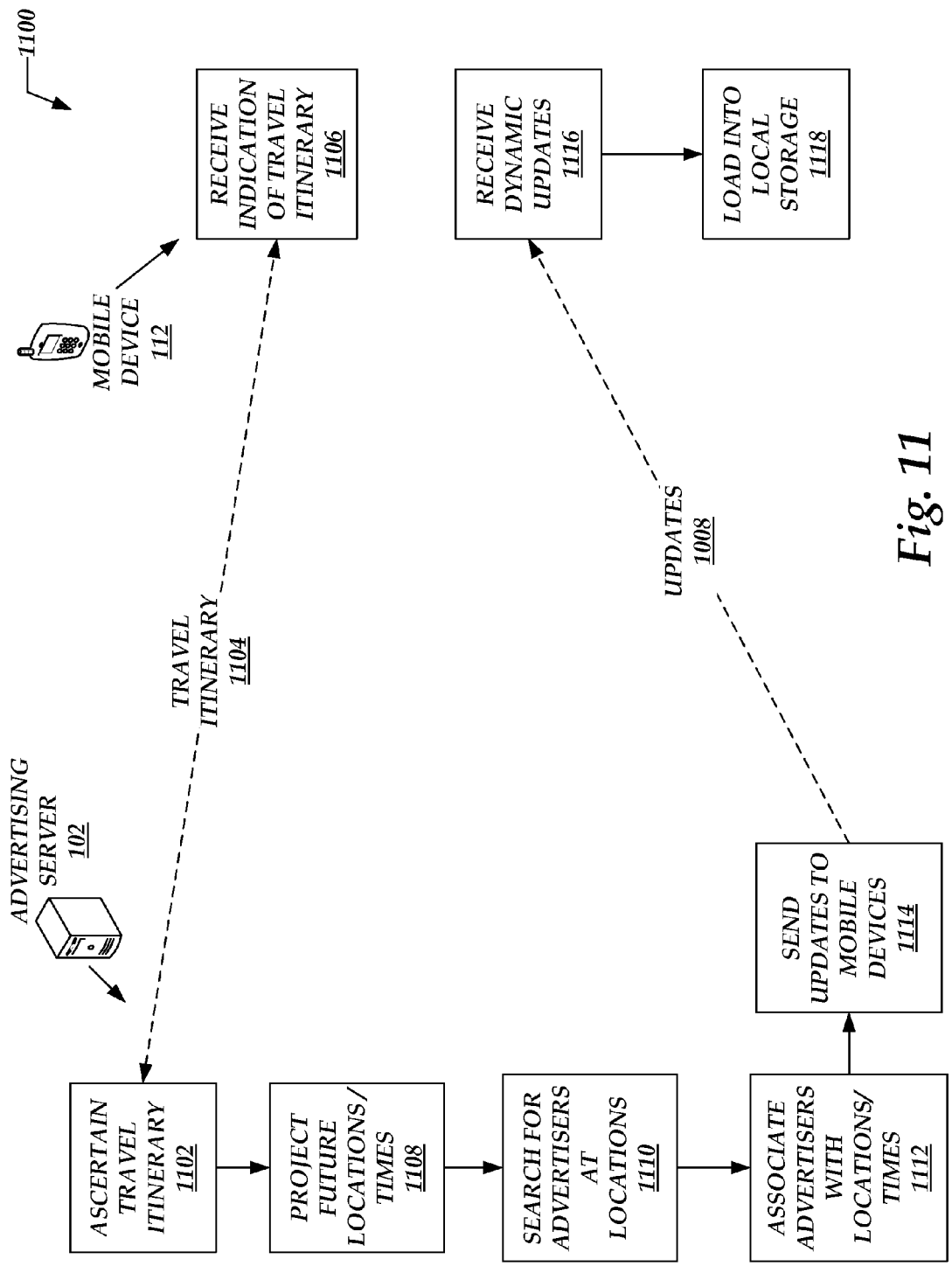
FIG. 11 is a flow diagram illustrating processes for dynamically updating mobile devices as mobile users pass through projected locations.

FIG. 11 illustrates process flows, denoted generally at 1100, related to dynamically updating a mobile device as a mobile user passes through various actual and projected physical locations. In the examples shown in FIG. 11, portions of the process flows 1100 are shown distributed between the advertising server 102 and the mobile device 112, only to facilitate the present description. However, it is noted that portions of the process flows 1100 may be performed on other devices without departing from the scope and spirit of the description.

Turning to the process flows 1100 in more detail, block 1102 represents ascertaining a travel itinerary 1104 associated with the mobile device 112 and/or a mobile user (e.g., 110 in previous Figures). As described in further detail below, in some scenarios, the advertising server 102 may infer the travel itinerary 1104 based on any number of previous locations through which the mobile device 112 has passed. In these scenarios, the advertising server 102 may communicate the inferred travel itinerary to the mobile device. In other scenarios, represented generally at block 1106, the mobile device 112 may receive an indication of the travel itinerary, as explicitly defined by the mobile user. The travel itinerary 1104 as shown in FIG. 11 represents a travel itinerary resulting from these or other scenarios.

Returning to the advertising server 102, block 1108 represents projecting one or more future locations along the travel itinerary 1104, through which the mobile device 112 and/or the mobile user is expected to pass. These future locations may be final destinations or endpoints, or may be intermediary waypoints through which the mobile device 112 passes on the way to the final destinations. FIG. 10 provides examples of these future or projected locations at 1010a and 1010n. Block 1108 may include projecting these future locations based on any number of past locations, previously visited by the mobile device, using any convenient projection techniques. Block 1108 may also include computing times at which the mobile device is expected or projected to arrive at the various future locations.

Block 1110 represents searching for merchants and/or advertisers in areas degrees of proximity to one or more of the projected or future locations computed for the mobile device. Various techniques for searching for these advertisers or advertisers are presented below in connection with FIG. 13.

Block 1112 represents associating various merchants and/or advertisers with the future or projected locations computed for a given mobile device 112. For example, block 1112 may include performing a bidding process, by which various advertisers may bid to become advertisers with respect to particular keywords within particular geographic locations, as described previously above in FIGS. 1-9. In addition, block 1112 may also include incorporating particular times into such bidding processes, such that merchants and/or advertisers may bid for the right to present advertisements to mobile devices that are within particular geographic areas at particular times.

Block 1114 represents sending the dynamic updates 1008 (carried forward from FIG. 10) to various mobile devices. As described above, these dynamic updates 1008 may specify which merchants and/or advertisers have obtained the right to respond to activations of particular keywords within particular geographic areas. In some cases, the dynamic updates 1008 may also specify any time limitations applicable to particular merchants or advertisers.

Referring now to the mobile device 112, block 1116 represents receiving the dynamic updates 1008. In the example shown, block 1116 may include receiving the dynamic updates from the advertising server 102.

In turn, block 1118 represents loading the dynamic updates into local storage within the mobile device 112. For example, block 1118 may include updating contact list, address books, or other storage elements to incorporate keyword representations included within the dynamic updates received in block 1116.

Figure 12:
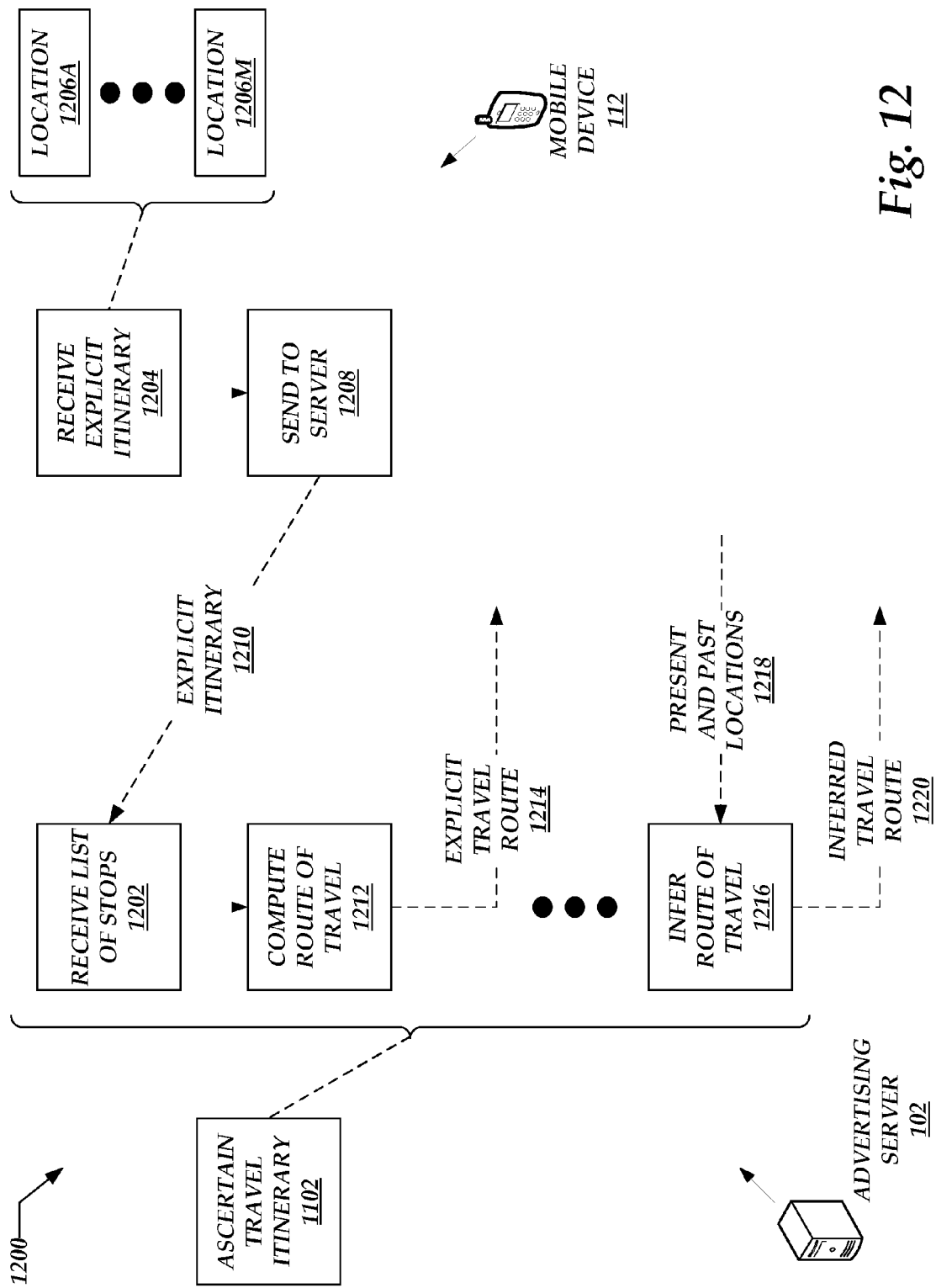
FIG. 12 is a combined block and flow diagram relating to ascertaining a travel itinerary as shown in FIG. 11.

FIG. 12 illustrates process flows and related data flows, denoted generally at 1200, relating to ascertaining the travel itinerary 1104 shown in FIG. 11. As discussed above with FIG. 10, the process and data flows 1200 are described in connection with the advertising server 102 and the mobile device 112. However, it is noted that implementations of these process and data flows may be performed in connection with other systems or components without departing from the scope and spirit of this description. In addition, without limiting possible implementations, the process and data flows 1200 may be understood as elaborating further on block 1102 shown in FIG. 11.

Block 1202 represents receiving a list of stops that were explicitly specified or defined by a mobile user, for example, referring to the mobile device 112, block 1204 represents receiving an itinerary that includes a plurality of locations 1206a and 1206m (collectively, locations 1206). For example, a mobile user may specify through the mobile device a set of errands that he or she wishes to perform. Particular stops within these errands may correspond to the locations 1206. In other examples, the mobile user may specify a set of intermediate or destination points included within future travels. In turn, block 1208 represents sending an explicit itinerary 1210 to the advertising server.

Returning to the advertising server 102, block 1212 represents computing a route of travel 1214 satisfying the explicit itinerary 1210. For example, block 1212 may include computing a travel route 1214 passing through any intermediate waypoints specified in the explicit itinerary, ultimately reaching a final destination specified in the itinerary. The itinerary 1210 may also specify constraints or costs to be minimized when computing the travel route. For example, a mobile user may specify a least-cost route, a least-mileage or least-distance route, a least-congestion or least-traffic route, a least-time route, as well as other examples of constraints. Block 1212 may utilize traveling salesman algorithms, linear programming techniques, or the like.

Blocks 1202 and 1212 represent processing associated with an explicitly-defined itinerary. However, the advertising server 102 may also infer the itinerary, in cases in which this itinerary is not explicitly specified. In these scenarios, block 1216 represents inferring a route of travel based on any number of present and past locations, represented generally at 1218. For example, if the advertising server 102 determines that a given mobile user has been traveling along a given interstate highway for some period of time, block 1216 may include inferring that the mobile user will continue to travel along that highway. Block 1216 may also include designating cities along that highway as possible future destinations for the mobile user. FIG. 12 represents an inferred travel route at 1220.

Figure 13:
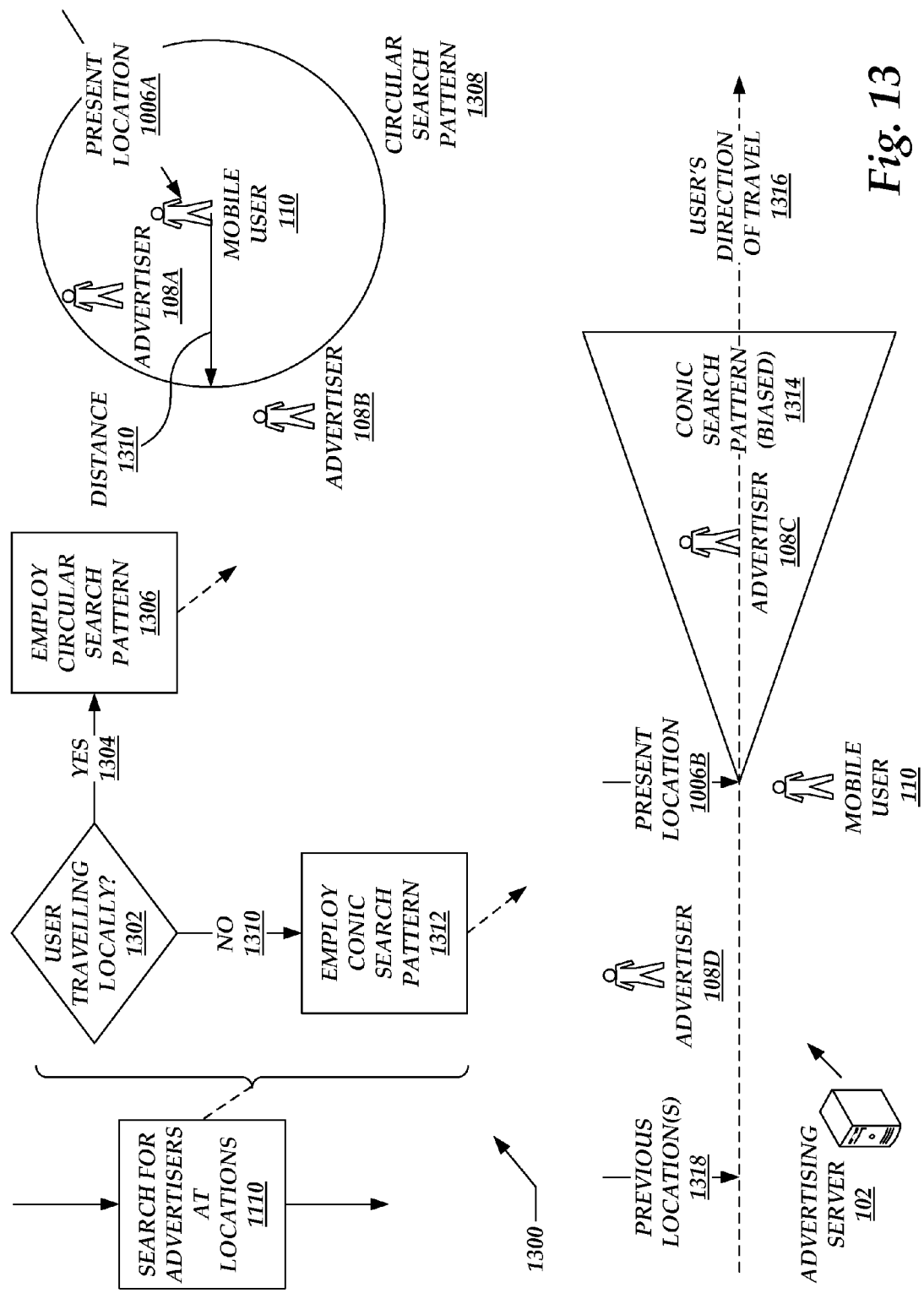
FIG. 13 is a combined block and flow diagram relating to searching for advertisers associated with various locations along a given travel itinerary.

FIG. 13 illustrates process flows and related block diagrams, denoted generally 1300, relating to searching for merchants associated with various locations along a given travel itinerary. For the purposes of this description, the process flows 1300 are described in connection with the advertising server 102. However, it is noted that implementations of these process and data flows may be performed in connection with other systems or components without departing from the scope and spirit of this description. In addition, without limiting possible implementations, the process flows and related block diagrams 1300 may be understood as elaborating further on block 1110 shown in FIG. 11.

Turning to FIG. 13 in more detail, decision block 1302 represents determining whether a given mobile user is traveling locally within a relatively confined geographic area. Examples of local travel may include a series of destinations that are relatively close to one another, within a given city or locality. Typically, local travel may use surface or city streets, as distinguished from limited-access freeways or interstate highways. Decision block 1302 may include analyzing these and other factors in determining whether a given user is engaged in local travel.

From decision block 1302, if the mobile user is engaged in local travel, the process flows 1300 may take Yes branch 1304 to block 1306. Block 1306 represents employing a circular search pattern 1308 when searching for advertisers who may advertise to the mobile user. For example, as shown in FIG. 13, a given mobile user 110 may be located at a given present location 1006a. If block 1302 determines that this mobile user 110 is traveling locally, it may be expected that this mobile user is willing to travel in any direction, relative to his or her present location, to conduct transactions with advertisers.

As described in previous drawings, mobile users may specify distance or proximity parameters, specifying an upper limit on how far they are willing to travel to transact with advertisers. FIG. 13 represents such distance parameters at 1310, which may serve as a radius for the generally circular search pattern 1308. In general, the present location of the mobile user may serve as the approximate center for the circular search pattern 1308. FIG. 13 also provides an example advertiser 108a that falls within the circular search pattern 1308, and another advertiser 108b that falls outside the circular search pattern. In example scenarios, the advertiser 108a may be presented to the mobile device associated with the user 110, while the advertiser 108b would not be presented to the mobile user.

Returning to decision block 1302, if it is determined that the mobile user is not traveling locally, the process flows 1300 may take No branch 1310 to block 1312. Block 1312 represents employing a conic search pattern when searching for advertisers or advertisers to present to the mobile users.

Referring to block 1312 in more detail, assuming that the mobile user 110 is not traveling locally, block 1312 may include defining a direction of travel associated with the mobile user, denoted generally at 1316. The direction of travel may be inferred, based on analyzing any number of previous positions 1318 associated with the mobile user 110.

Assuming that the mobile user is at a present location 1006b, it may be expected that the mobile user will continue along the predicted direction of travel 1316, and will be more interested in transacting with advertisers located along the direction of travel. Accordingly, FIG. 13 provides an example advertiser 108c located along the direction of travel, and within the generally conic or triangular-shaped search pattern 1314. FIG. 13 also provides another example advertiser 108d that is not selected for presentation, because this advertiser is "behind" the location of the mobile user. In this latter scenario, it is expected that the mobile user would not be interested in reversing his or her course of travel to transact with the advertiser 108d.

It is noted that the shape of the search pattern 1314 is provided in FIG. 13 only as an example, but not to limit possible implementations. In general, the search pattern 1314 may be biased along the direction of travel 1316, in cases where it is determined that the mobile user is not traveling locally. In the context of this description, the term "biased" may refer to scenarios in which advertisers closer to the direction of travel 1316 are more likely to be selected for presentation to the mobile users. In some cases, advertisers who are closer to the location of the mobile user may be selected for presentation to mobile users. In other cases, other advertisers who are more distant from the mobile user, while also located along the user's direction of travel, may be selected for presentation to the mobile user, even though these advertisers may be somewhat farther away from the user's direction of travel. These scenarios may result in the illustrative cone- or funnel-shaped search pattern 1314 shown in FIG. 13.

Figure 14:
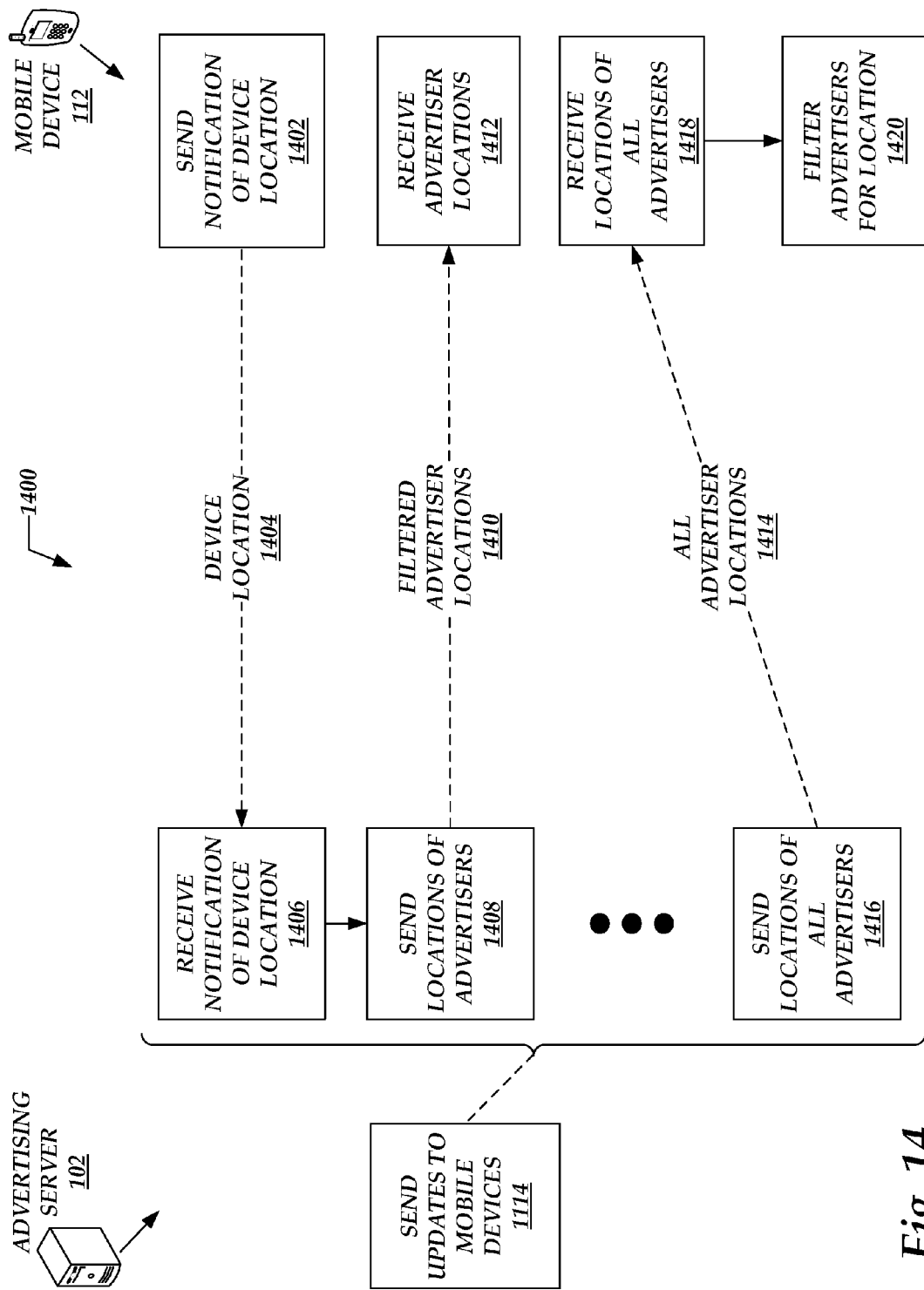
FIG. 14 is a flow diagram illustrating processes for sending dynamic updates to the mobile devices.

FIG. 14 illustrates process flows, denoted generally at 1400, related to sending dynamic updates to mobile devices. For ease of description, the process flows 1400 are described in connection with the advertising server 102 and the mobile device 112. However, it is noted that the process flows 1400 may be performed with devices or components other than those shown in FIG. 14, without departing from the scope and spirit of the present description. Without limiting possible implementations, the process flows 1400 may be understood as elaborating further on block 1114, as carried forward from FIG. 11.

Beginning, for example, at the mobile device 112, block 1402 represents sending a notification 1404 of the device's current or present location. The present locations of the mobile devices may be expressed using any convenient techniques, such as triangulating from cellular transmissions towers, for example. In the example shown in FIG. 14, block 1402 may include sending representations of the device locations 1404 to the advertising server 102.

At the advertising server 102, block 1406 represents receiving the notification of the device location 1404. Recalling from previous discussion that block 1110 searches for advertiser locations, block 1408 represents sending locations of those advertisers proximate to the device location 1404. Put differently, block 1408 may include performing any geographic filtering of merchant or advertiser locations on the advertising server 102. FIG. 14 denotes these advertiser locations generally at 1410, and block 1408 may include sending the advertiser locations 1410 to the mobile device.

At the mobile device 112, block 1412 represents receiving the advertiser locations 1410. In the scenario represented by block 1408 and 1412, the advertising server 102 performs any geographic filtering, and sends filtered advertiser locations 1410 to the mobile device 112. However, in other possible scenarios, the advertising server 102 may not geographically filter the advertiser locations, but instead may send all advertiser locations 1414 to the mobile device 112, as represented generally by block 1416.

At the mobile device 112, block 1418 represents receiving the locations of all advertisers from the advertising server 102. In turn, block 1420 represents filtering the advertiser locations geographically on the mobile device 112.

Figure 15:
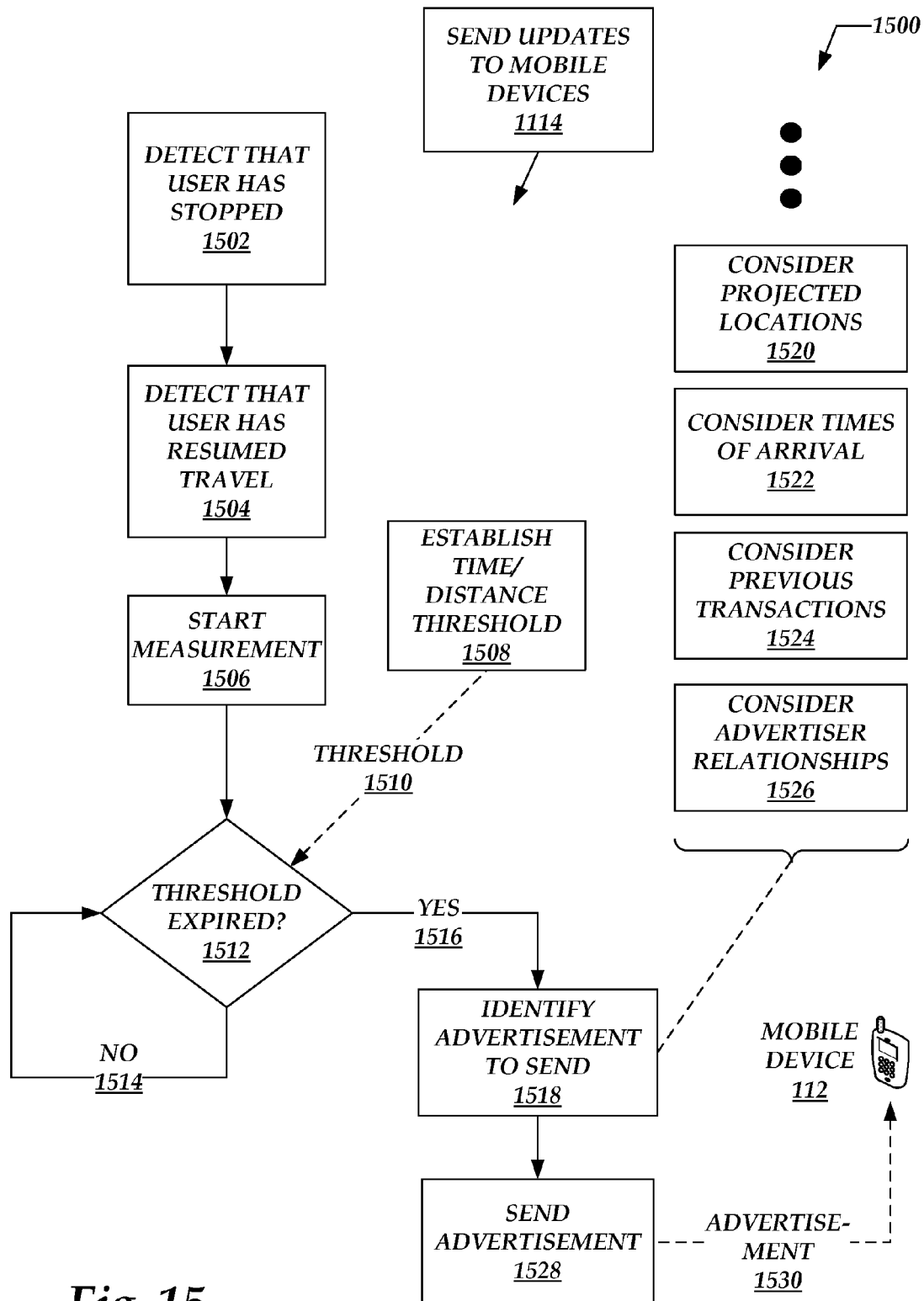
FIG. 15 is a flow diagram illustrating additional processes for sending dynamic updates to the mobile devices.

FIG. 15 illustrates additional process flows, denoted generally at 1500, related to sending dynamic updates to mobile devices. Without limiting possible implementations, the process flows 1500 may be understood as elaborating further on block 1114 in FIG. 11.

Turning to the process flows 1500 in more detail, block 1502 represents detecting that a given mobile user has stopped at some point along a given travel itinerary (e.g., 1104 in FIG. 11). For example, block 1502 may include the advertising server monitoring signals exchanged between cellular communications towers and a given mobile device, and determining, based on triangulating those signals, that the mobile device associated with the given mobile user is not currently moving. Block 1502 may also include determining that the mobile device has not moved for some interval of time, in connection with determining that the mobile device is not currently moving.

Block 1504 represents detecting that the given mobile user has resumed movement, after having stopped for some period of time. Block 1504 may include using similar techniques to detect movement as block 1502 used to detect lack of movement. For example, a given mobile user may be traveling between states along an interstate highway, and may stop at a given gas station to refuel. Once the mobile user is stopped for some period of time while refueling, block 1502 may detect that a mobile device associated with the user has not moved for that period of time. Once refueling is complete, the mobile user may resume his or her journey, with block 1504 detecting that the mobile device has resumed movement.

Block 1506 represents beginning or initiating a measurement in response to detecting that the user has resumed movement in block 1504. Block 1506 may include measuring elapsed time, distance traveled, or other convenient parameters occurring since the user resumed movement in block 1504.

Block 1508 represents establishing a threshold 1510 applicable to elapsed time, distance traveled, or other parameter related to the mobile user, after the user resumes travel in block 1504. For example, block 1508 may occur in parallel with at least one of blocks 1502-1506.

Decision block 1512 represents determining whether the threshold 1510 established in block 1508 has expired. For example, if the threshold 1510 is a time threshold, block 1512 may include evaluating whether a time threshold has expired since the user resumed travel in block 1504. As another example, if the threshold 1510 is a distance threshold, block 1512 may include evaluating whether the mobile user has traveled that distance since resuming travel in block 1504.

Recalling the refueling example introduced above, block 1508 may include establishing a distance threshold for measuring how many miles the mobile user is expected to travel before refueling again. Block 1506 may include starting a mileage counter when the mobile user resumes travel after a first refueling stop, and decision block 1512 may include monitoring this mileage counter to determine when the mobile user is expected to stop again for another refueling. Assuming information is available about the type of vehicle in which the mobile user is traveling, block 1512 may include calculating mileage expectations specifically for that particular vehicle.

From decision block 1512, the process flows 1500 may take No branch 1514 so long as the threshold 1510 has not expired. However, when the threshold 1510 expires, or nears expiration, the process flows 1500 may take Yes branch 1516 to block 1518, which represents identifying an advertisement or other advertiser-related information to send to the mobile device (e.g., 112).

Turning to block 1518 in more detail, various factors may be considered in identifying an advertisement for sending to the mobile device. For example, block 1520 represents considering projected locations calculated for a given mobile user, and block 1522 represents considering times in which the mobile user is projected to arrive at these locations. If blocks 1520 and 1522 indicate that the mobile user is expected to arrive at a relatively large city late in the day, and block 1518 may identify food-related or lodging-related advertisements to send to the user's mobile device. In addition, block 1522 may include considering operating or business hours associated with particular advertisers, in determining which advertisements to send to the mobile device. For example, block 1522 may include determining that a given advertiser or merchant is open and operating when the mobile user is projected to arrive at the advertiser or merchant's place of operation.

Block 1524 represents considering the use nature and content of previous transactions involving the given mobile user. For example, returning to the refueling example from above, the user may exhibit a history or pattern of stopping periodically to refuel (or for other reasons) after a certain period of time lapses, or after traveling a certain number of miles. In such cases, block 1518 may include sending advertisements related to service stations located where the mobile user is expected to stop next to refuel, whether calculated based on elapsed time, miles traveled, or other factors.

Block 1526 represents considering any relationships between the mobile user and advertisers having locations along a route along which the mobile user is expected or projected to travel. For example, merchants or advertisers may establish loyalty programs, frequent-traveler programs, reward systems, or the like. Block 1526 may include evaluating whether a given mobile user is a member in any such programs established by merchants or advertisers. In this manner, block 1518 may guide or direct mobile users toward merchants or advertisers with whom they have a pre-existing relationships.

Block 1528 represents sending the selected advertisement to the mobile device 112, for presentation to the mobile user. FIG. 15 represents an example advertisement at 1530, and the advertisement 1530 may be included as part of the dynamic updates 1008 shown in FIG. 10.

It will be appreciated that the tools and techniques illustrated and described in FIGS. 10-15 provide for dynamically and predictively updating mobile devices, as mobile users pass through various actual and projected physical locations. The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

Based on the foregoing, it should be appreciated that apparatus, systems, methods, and computer-readable media for translating search strings into street addresses are provided herein. Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the claimed subject matter, which is set forth in the following claims.

What is claimed is:

1. A computer-readable storage device comprising computer-executable instructions that, when executed by a processor, cause the processor to perform operations comprising:
   ascertaining a travel itinerary for a mobile user associated with a mobile device;
   determining an expected area through which the mobile user is to pass when traveling according to the itinerary;
   determining whether the mobile device is traveling locally;
   searching for advertisers proximate the expected area;
   associating a particular advertiser found in the search with the expected area; and
   initiating sending, to the mobile device, advertising data associated with the particular advertiser;
   wherein the operation of searching for advertisers comprises:
      searching, if the mobile device is determined to be traveling locally, for advertisers using a circular search pattern; and
      searching, if the mobile device is determined to not be traveling locally, for advertisers using a conical search pattern.

2. The computer-readable storage device of claim 1, wherein the operations further comprise enabling, in response to a keyword representation stored within the mobile device being activated while the mobile device is within the expected area, a plurality of advertisers, including the particular advertiser, to bid for rights to respond to the mobile user.

3. The computer-readable storage device of claim 1, wherein the operations further comprise projecting a time at which the mobile user is expected to arrive at the expected area, and wherein the operation of searching for advertisers includes comparing operating hours associated with a plurality of advertisers including the particular advertiser with the time at which the mobile user is projected to arrive at the expected area.

4. The computer-readable storage device of claim 1, wherein:
   the operation of ascertaining the travel itinerary comprises receiving, from the mobile device, a list of planned destinations;
   the list specifies explicitly destinations within the travel itinerary;
   the operation of ascertaining the travel itinerary further comprises computing a solution for the list; and
   the operations further comprise sending, to the mobile device, a representation of the solution.

5. The computer-readable storage device of claim 1, wherein the operation of ascertaining the travel itinerary comprises inferring, based on a plurality of previous locations associated with the mobile device, a destination associated with the travel itinerary.

6. The computer-readable storage device of claim 1, wherein the operation of ascertaining the travel itinerary comprises inferring, based on a road on which the mobile user is currently traveling, a destination associated with the travel itinerary.

7. A system, comprising:
   a processor; and
   a computer-readable storage medium comprising computer-executable instructions that, when executed by a processor, cause the processor to perform operations comprising:
      ascertaining a travel itinerary for a mobile user associated with a mobile device;
      determining an expected area through which the mobile user is to pass when traveling according to the itinerary;
      determining whether the mobile device is traveling locally;
      searching for advertisers proximate the expected area;
      associating a particular advertiser found in the search with the expected area; and
      initiating sending, to the mobile device, advertising data associated with the particular advertiser;
      wherein the operation of searching for advertisers comprises:

searching, if the mobile device is determined to be traveling locally, for advertisers using a circular search pattern; and searching, if the mobile device is determined to not be traveling locally, for advertisers using a conical search pattern.

8. The system of claim 7, wherein the operations further comprise enabling, in response to a keyword representation stored within the mobile device being activated while the mobile device is within the expected area, a plurality of advertisers, including the particular advertiser, to bid for rights to respond to the mobile user.

9. The system of claim 7, wherein the operations further comprise projecting a time at which the mobile user is expected to arrive at the expected area, and wherein the operation of searching for advertisers includes comparing operating hours associated with a plurality of advertisers including the particular advertiser with the time at which the mobile user is projected to arrive at the expected area.

10. The system of claim 7, wherein:
the operation of ascertaining the travel itinerary comprises receiving, from the mobile device, a list of planned destinations;
the list specifies explicitly destinations within the travel itinerary;
the operation of ascertaining the travel itinerary further comprises computing a solution for the list; and
the operations further comprise sending, to the mobile device, a representation of the solution.

11. The system of claim 7, wherein the operation of ascertaining the travel itinerary comprises inferring, based on a plurality of previous locations associated with the mobile device, a destination associated with the travel itinerary.

12. The system of claim 7, wherein the operation of ascertaining the travel itinerary comprises inferring, based on a road on which the mobile user is currently traveling, a destination associated with the travel itinerary.

13. A method, comprising:
ascertaining, by a system using a processor, a travel itinerary for a mobile user associated with a mobile device;
determining, by the system, an expected area through which the mobile user is to pass when traveling according to the itinerary;
determining whether the mobile device is traveling locally;
searching, by the system, for advertisers proximate the expected area;
associating, by the system, a particular advertiser found in the search with the expected area; and
initiating, by the system, sending, to the mobile device, advertising data associated with the particular advertiser;
wherein searching for advertisers comprises:
searching, if the mobile device is determined to be traveling locally, for advertisers using a circular search pattern; and
searching, if the mobile device is determined to not be traveling locally, for advertisers using a conical search pattern.

14. The method of claim 13, wherein the method further comprises enabling, in response to a keyword representation stored within the mobile device being activated while the mobile device is within the expected area, a plurality of advertisers, including the particular advertiser, to bid for rights to respond to the mobile user.

15. The method of claim 13, wherein the method further comprises projecting a time at which the mobile user is expected to arrive at the expected area, and searching for advertisers includes comparing operating hours associated with a plurality of advertisers including the particular advertiser with the time at which the mobile user is projected to arrive at the expected area.

16. The method of claim 13, wherein:
ascertaining the travel itinerary comprises receiving, from the mobile device, a list of planned destinations;
the list specifies explicitly destinations within the travel itinerary;
ascertaining the travel itinerary further comprises computing a solution for the list; and
the method further comprises sending, to the mobile device, a representation of the solution.

17. The method of claim 13, wherein ascertaining the travel itinerary comprises inferring, based on a plurality of previous locations associated with the mobile device, a destination associated with the travel itinerary.

18. The method of claim 13, wherein ascertaining the travel itinerary comprises inferring, based on a road on which the mobile user is currently traveling, a destination associated with the travel itinerary.

* * * * *